(12) United States Patent
Kusanose et al.

(10) Patent No.: US 8,772,415 B2
(45) Date of Patent: Jul. 8, 2014

(54) HYDROGENATED BLOCK COPOLYMERS AND CROSSLINKING COMPOSITIONS CONTAINING THE SAME

(75) Inventors: Yasuhiro Kusanose, Tokyo (JP); Masahiro Fujiwara, Tokyo (JP); Daisuke Shimizu, Tokyo (JP)

(73) Assignee: Asahi Kasei Chemicals Corporation, Tokyo (JP)

( * ) Notice: Subject to any disclaimer, the term of this patent is extended or adjusted under 35 U.S.C. 154(b) by 997 days.

(21) Appl. No.: 12/375,672

(22) PCT Filed: Aug. 7, 2007

(86) PCT No.: PCT/JP2007/065420
§ 371 (c)(1),
(2), (4) Date: Oct. 21, 2009

(87) PCT Pub. No.: WO2008/018445
PCT Pub. Date: Feb. 14, 2008

(65) Prior Publication Data
US 2010/0087559 A1    Apr. 8, 2010

(30) Foreign Application Priority Data

Aug. 8, 2006  (JP) ................................. 2006-216152
Aug. 8, 2006  (JP) ................................. 2006-216153

(51) Int. Cl.
*C08F 136/04*    (2006.01)
*C08F 8/04*      (2006.01)
*C08L 53/02*     (2006.01)

(52) U.S. Cl.
USPC .............................. 525/338; 525/98; 521/148

(58) Field of Classification Search
CPC ....................................................... C08F 8/04
See application file for complete search history.

(56) References Cited

U.S. PATENT DOCUMENTS

| | | | |
|---|---|---|---|
| 5,268,427 A | 12/1993 | Coolbaugh et al. | |
| 5,292,820 A | 3/1994 | Coolbaugh et al. | |
| 5,374,118 A * | 12/1994 | Kruck et al. | 312/407 |
| 5,393,841 A * | 2/1995 | Himes et al. | 525/314 |
| 5,416,163 A | 5/1995 | Coolbaugh et al. | |
| 5,717,035 A | 2/1998 | Coolbaugh et al. | |
| 5,948,861 A | 9/1999 | Coolbaugh et al. | |
| 6,844,383 B2 * | 1/2005 | Hoshi et al. | 524/291 |
| 2004/0157994 A1 * | 8/2004 | Kubo et al. | 525/88 |
| 2010/0087559 A1 | 4/2010 | Kusanose et al. | |

FOREIGN PATENT DOCUMENTS

| | | |
|---|---|---|
| JP | 59131613 A | 7/1984 |
| JP | 7-116271 A | 4/1994 |
| JP | 7188361 | 7/1995 |
| JP | 8225713 A | 9/1996 |
| JP | 2002-504589 | 8/1999 |
| JP | 2000109640 A | 4/2000 |
| JP | 2000-186179 | 7/2000 |
| JP | 2003-073433 | 3/2003 |
| JP | 2003113281 A | 4/2003 |
| JP | 2003-138073 | 5/2003 |
| JP | 2003138073 A | 5/2003 |
| JP | 2005126485 A | 5/2005 |
| KR | 0449373 | 11/2002 |
| KR | 0348381 | 9/2004 |
| WO | WO-01-90207 A1 | 11/2001 |
| WO | WO-02-094932 A1 | 11/2002 |
| WO | 2008/018445 A1 | 2/2008 |

OTHER PUBLICATIONS

Japanese Office Action dated Sep. 7, 2012; Japanese Patent Application No. 2009-101812.

* cited by examiner

*Primary Examiner* — Randy Gulakowski
*Assistant Examiner* — Jeffrey Washville
(74) *Attorney, Agent, or Firm* — Morgan, Lewis & Bockius LLP

(57) ABSTRACT

The disclosure provides a hydrogenated straight-chain block copolymer, obtained by selective hydrogenation of a straight-chain block copolymer.

26 Claims, No Drawings

US 8,772,415 B2

HYDROGENATED BLOCK COPOLYMERS AND CROSSLINKING COMPOSITIONS CONTAINING THE SAME

The present application is a U.S. National Phase Application of International Application No. PCT/JP2007/065420 (filed Aug. 7, 2007) which claims the benefit of Japanese Patent Application No. 2006-21652 (filed Aug. 8, 2006) and Japanese Patent Application No. 2006-216153 (filed Aug. 8, 2006), all of which are hereby incorporated by reference in their entireties.

TECHNICAL FIELD

The present invention relates to a hydrogenated block copolymer and its dynamic crosslinking composition which can be used very effectively for various types of molded products including autoparts, civil engineering and building applications, household appliance parts, sporting goods, sundry articles and stationery, and other wide applications, excel in a balance of oil resistance, compression set at high temperatures and elongation at break, low impact resilience, abrasion resistance and surface touch feeling, and have favorable moldability and flexible and favorable rubbery characteristics.

BACKGROUND ART

Hydrogenated products of block copolymers (hereinafter, referred to as hydrogenated block copolymers) containing a styrenic polymer block and a diene polymer block have a rubber elasticity at ambient temperature, can be plasticized and melted by heating to be easily molded, and moreover excel in a balance of flexibility and mechanical characteristics, so they are used in a wide range of fields such as autoparts, household appliances, wire covering, medical parts, sundry articles and footwear, and in recent years, are highly expected to be alternative materials to vinyl chloride resins because of environmental problems.

However, these styrenic hydrogenated block copolymers are insufficient in the rubber elasticity at high temperatures, for example, at 100° C. or more. Further, these styrenic hydrogenated block copolymers sometimes raise a problem of oil resistance depending on their applications.

Then, several proposals have been made on elastomeric compositions using hydrogenated block copolymers. For example, Patent Document 1, Patent Document 2 and Patent Document 3 propose that by crosslinking an elastomeric composition containing a hydrocarbon oil, an olefinic polymer and the like formulated in a hydrogenated block copolymer by using a crosslinking agent such as an organic peroxide, and a crosslinking aid, the compression set at high temperatures of an obtained elastomeric composition is improved. Further, many methods are known in which a partially hydrogenated block copolymer having residual unsaturated groups of a block copolymer (hereinafter, referred to as partially hydrogenated block copolymer), of which conjugated diene parts of its molecular chain central part are partially hydrogenated, is vulcanized.

However, since though the elastomeric compositions containing a hydrogenated block copolymer have recyclability as a feature of thermoplastic elastomers, mainly soft segments are crosslinked which are composed of conjugated diene monomer blocks of the hydrogenated block copolymer, the rubber elasticity is insufficient, and the compression set at high temperatures comparable to that of vulcanized rubbers have not been achieved. When the crosslinking density is raised for improving the rubber elasticity, obtained compositions have a small elongation, thus not providing preferable ones actually.

Patent Document 4 proposes hydrogenated block copolymers having small blocks of 100 or less in polymerization degree containing unsaturated groups at molecular chain terminals. In an example thereof, a hydrogenated block copolymer composition is exemplified which has small blocks of styrene/isoprene random copolymer at molecular terminals. However, such a hydrogenated block copolymer containing small styrene blocks has a decreased cohesive force of the styrene blocks, often resulting in a large compression set.

Patent Document 1: JP-A-59-131613
Patent Document 2: JP-A-8-225713
Patent Document 3: JP-A-2000-109640
Patent Document 4: JP-B-7-116271

DISCLOSURE OF THE INVENTION

Problems to be Solved by the Invention

It is an object of the present invention to provide a hydrogenated block copolymer excellent in productivity, processability and crosslinking reactivity, and a crosslinking composition of the hydrogenated block copolymer, and further specifically, it is an object thereof to provide a hydrogenated block copolymer and its crosslinking composition which excel in a balance of oil resistance, compression set at high temperatures and elongation at break, low impact resilience, abrasion resistance and surface touch feeling, and have favorable moldability and flexible and favorable rubbery characteristics.

Means for Solving the Problems

As a result of exhaustive studies to solve the problems above, the present inventors have found that the problems can be solved by using a hydrogenated block copolymer having a specific block structure and having two or more unsaturated bonds, and its dynamic crosslinking composition. This has led to the achievement of the present invention.

That is, the present invention is as follows.

1. A hydrogenated block copolymer, obtained by selective hydrogenation of a block copolymer comprising: at least two polymer blocks A which each comprise a vinyl aromatic monomer unit as a main component and which may be the same or different from each other; at least two polymer blocks B which each comprise a conjugated diene monomer unit having 5 or more carbon atoms as a main component and which may be the same or different from each other; and one or more polymer blocks C which each comprise a conjugated diene monomer unit having 4 or more carbon atoms as a main component and which may be the same or different from each other; and/or one or more random copolymer blocks D which each comprise a conjugated diene monomer unit having 4 or more carbon atoms (d-1) and a vinyl aromatic monomer unit (d-2) as main components and which may be the same or different, wherein the polymer block B has a hydrogenation rate of 50% or less for olefinic unsaturated double bonds; the polymer blocks C and D have a hydrogenation rate of 80% or more for olefinic unsaturated double bonds; the block copolymer comprises 10% by weight to 85% by weight of the vinyl aromatic monomer unit; and the block copolymer has contents of 10% by weight to 70% by weight of A, 1% by weight to 15% by weight of B, 0% by weight to 85% by weight of C, 0% by weight to 85% by weight of D and 25% by weight to 85% by weight of C+D, based on 100% by weight of the total of A+B+C+D; and A has a weight-average molecular weight M of M≥20,000/(1+a content % of (d-2)/20).

2. The hydrogenated block copolymer according to 1., obtained by hydrogenation of a block copolymer comprising 2% by weight to 80% by weight of the random copolymer block D.
3. The hydrogenated block copolymer according to 1. or 2., obtained by hydrogenation of a block copolymer comprising 2% by weight to 80% by weight of the polymer block C.
4. The hydrogenated block copolymer according to any one of 1. to 3., wherein the random copolymer D has a ratio of 30% by weight or more for the vinyl aromatic monomer unit (d-2) to 100% by weight of the random copolymer D.
5. The hydrogenated block copolymer according to any one of 1. to 4., wherein the polymer block C has a vinyl bond amount of 15% to 80% in the whole conjugated diene.
6. The hydrogenated block copolymer according to any one of 1. to 5., wherein the polymer block D has a vinyl bond amount of 10% to 50% in the whole conjugated diene.
7. The hydrogenated block copolymer according to any one of 1. to 6., wherein the conjugated diene of the polymer block B is isoprene.
8. The hydrogenated block copolymer according to any one of 1. to 7., wherein the conjugated dienes of the polymer block C and the polymer block D are 1,3-butadiene.
9. The hydrogenated block copolymer according to 1., wherein the conjugated diene of the polymer block B is isoprene; and the conjugated dienes of the polymer block C and the polymer block D are 1,3-butadiene, and wherein the block copolymer is hydrogenated using a compound comprising a titanocene compound as a hydrogenation catalyst; 90% or more of 1,3-butadiene of the polymer block C and the polymer block D is hydrogenated; and 90% or more of 1,4-bonds in isoprene of the polymer block B is not hydrogenated, and the hydrogenation rate of 3,4-bonds therein is 50% or less.
10. The hydrogenated block copolymer according to any one of 1. to 9., having the polymer blocks A on both terminals thereof, and internally containing the polymer block B.
11. The hydrogenated block copolymer according to any one of 1. to 10., obtained by hydrogenation of the block copolymer comprising three or more polymer blocks B and at least one polymer block B as an internal block.
12. The hydrogenated block copolymer according to any one of 1. to 11., wherein the terminal block parts of the hydrogenated block copolymer comprise the polymer block A or the polymer block B; and the hydrogenated block copolymer is a straight-chain block copolymer represented by the general formula shown below:

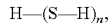

or a straight-chain block copolymer or a radial block copolymer represented by the general formula shown below:

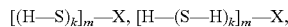

wherein H denotes a block copolymer of A-B or B-A, or a random copolymer of A/B, and H's may be the same or different; S denotes a homoblock of C or a homoblock of D, or a block copolymer of C-D or D-C, and may contain 10% by weight or less of the B block, and S's may be the same or different; n and k are each an integer of 1 to 5, and m is an integer of 2 to 6; X denotes a residue of a coupling agent or a residue of a polyfunctional initiator; and when the polymer blocks A to D are each present in a plural number in the copolymer, the respective structures such as molecular weights and compositions may be each the same or different.

13. The hydrogenated block copolymer according to any one of 1. to 12., having a weight-average molecular weight of 30,000 to 2,000,000 in terms of polystyrene.
14. The functionalized hydrogenated block copolymer according to any one of 1. to 13., wherein the polymer block B containing residual olefinic unsaturated double bonds comprises a functional group.
15. A dynamic crosslinking composition comprising 10 to 300 parts by weight of a thermoplastic resin and 0.01 to 30 parts by weight of a crosslinking agent with respect to 100 parts by weight of the hydrogenated block copolymer or the functionalized hydrogenated block copolymer according to any one of 1. to 14.
16. A dynamically crosslinked body, obtained by melting and kneading the dynamic crosslinking composition according to 15. at a high temperature.
17. A crosslinking and foaming composition comprising the hydrogenated block copolymer or the functionalized hydrogenated block copolymer according to any one of 1. to 14., a crosslinking agent, and a foaming agent.
18. A crosslinked and foamed body, obtained by crosslinking and foaming the crosslinking and foaming composition according to 17.
19. A functionalized hydrogenated block copolymer resin composition, comprising the functionalized hydrogenated block copolymer (E) according to 14., and a polar thermoplastic resin (F) having a functional group reactive with the component (E), and/or a rubbery polymer (F) having a functional group reactive with the component (E), wherein the formulation ratio (weight ratio) of the component (E) to the component(s) (F) is 1/99 to 99/1.
20. The functionalized hydrogenated block copolymer resin composition according to 19., wherein the component (F) is at least one polar thermoplastic resin selected from polyester resins, polyamide resins, polycarbonate resins, polyurethane resins, polyphenylene ether resins and polyoxymethylene resins.

Advantages of the Invention

The hydrogenated block copolymer of the present invention has a favorable thermal stability, and excels in productivity, processability and crosslinking reactivity. Further, the dynamic crosslinking composition of the hydrogenated block copolymer of the present invention excels in a balance of oil resistance, compression set at high temperatures and elongation at break, and has a favorable moldability and flexible and favorable rubbery characteristics.

BEST MODE FOR CARRYING OUT THE INVENTION

Hereinafter, the present invention will be described specifically.

In the present invention, nomenclature of each monomer unit constituting a polymer follows nomenclature of a monomer the monomer unit originates from. For example, "vinyl aromatic monomer unit" means a constituting unit of a polymer produced by polymerizing a vinyl aromatic compound as a monomer, and its structure is a molecular structure in which two carbons of a substituted ethylene group originating from a substituted vinyl group are bonding sites. "Conjugated diene monomer unit" means a constituting unit of a polymer produced by polymerizing a conjugated diene as a monomer, and its structure is a molecular structure in which two carbons of an olefin originating from a conjugated diene monomer are bonding sites.

The hydrogenated block copolymer of the present invention is obtained by hydrogenating a non-hydrogenated block copolymer comprising a vinyl aromatic monomer unit and two or more kinds of conjugated diene monomer units. The hydrogenated block copolymer of the present invention is a hydrogenated block copolymer obtained by hydrogenating a non-hydrogenated block copolymer which comprises a polymer block A comprising a vinyl aromatic monomer unit as a main component, a polymer block B comprising a conjugated diene monomer unit having 5 or more carbon atoms as a main component, and a polymer block C comprising a conjugated diene monomer unit having 4 or more carbon atoms as a main component and/or a random copolymer block D comprising a conjugated diene monomer unit having 4 or more carbon atoms and a vinyl aromatic monomer unit as main components, and which has at least two polymer blocks A, at least two polymer blocks B, and at least one polymer block C and/or at least one random copolymer block D. Here, when the polymer blocks A, B, C and D are each present in a plural number in a copolymer, the polymer blocks in plural numbers may be each the same or different. For example, when there are present two polymer blocks A, the two may be the same or different.

The block copolymer obtained by the method is, for example, a straight-chain block copolymer represented by the general formula shown below:

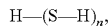

or a straight-chain block copolymer or a radial block copolymer represented by the general formula shown below:

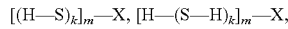

wherein H denotes a block copolymer of A-B or B-A, or a random copolymer of A/B, and H's may be the same or different; S denotes a homoblock of C or a homoblock of D, or a block copolymer of C-D or D-C, and may contain 10% by weight or less of the B block, and S's may be the same or different; n and k are each an integer of 1 to 5, and m is an integer of 2 to 6; X denotes a residue of a coupling agent or a residue of a polyfunctional initiator; and when the polymer blocks A to D are each present in a plural number in the copolymer, the respective structures such as molecular weights and compositions may be each the same or different.

Above the general formulae shown above, a straight-chain block copolymer represented by H—S—H is more preferable in that it has a small compression set and flexible and favorable rubbery characteristics.

If the hydrogenated block copolymer of the present invention is a hydrogenated block copolymer obtained by hydrogenating a non-hydrogenated block copolymer of a type comprising polymer blocks A containing vinyl aromatic monomer units as main components at both the terminals and comprising a polymer block B containing a conjugated diene monomer unit having 5 or more carbon atoms as a main component in the internal part thereof, the micro phase separation occurs more evidently, and the cohesive force of the polymer block A containing a vinyl aromatic monomer unit as a main component becomes stronger. Consequently, the hydrogenated block copolymer is improved in sticky feeling and compression set.

If the hydrogenated block copolymer of the present invention is a hydrogenated block copolymer obtained by hydrogenating a non-hydrogenated block copolymer of a type comprising 3 or more polymer blocks B containing a conjugated diene monomer unit having 5 or more carbon atoms as a main component and comprising at least one polymer block B in the internal part of the molecular chain, its crosslinked product is improved in oil resistance and compression set.

"Random" used in the present invention may be a uniform distribution of two or more monomer units, or a nonuniform distribution (for example, tapered one) thereof.

"As a main component(s)" used in the present invention indicates that a monomer unit is contained in 60% by weight or more in a block. For example, in the case of "a polymer block containing an A unit as a main component", the A (monomer) unit is contained in 60% by weight or more in a block.

A polymer block H contains a polymer block A containing a vinyl aromatic monomer unit as a main component and a polymer block B containing a conjugated diene monomer unit as a main component, preferably in a weight ratio of 75 to 97% by weight and 3 to 25 parts by weight, respectively. The polymer block A is preferably 75% by weight or more, that is, the polymer block B is preferably 25% by weight or less, in view of improving tackiness of the hydrogenated block copolymer, blocking of the polymer, productivity and compression set. On the other hand, the polymer block A is preferably 97% by weight or less, that is, the polymer block B is preferably 3% by weight or more, in view of a high crosslinking reactivity of the hydrogenated block copolymer because of a large number of unsaturated groups thereof. The ratio (B/H) of the polymer block B is more preferably 5 to 23% by weight, and still more preferably 7 to 20% by weight. H is more preferably a complete block copolymer of A-B or B-A in view of improving compression set.

The hydrogenated block copolymer of the present invention has preferably a content of 10% by weight to 70% by weight of a polymer block A with respect to the total weight of the hydrogenated block copolymer. The polymer block A is preferably 70% by weight or less in view of flexibility and rubbery characteristics of the hydrogenated block copolymer. By contrast, the polymer block A is preferably 10% by weight or more in view of handleability (non-tackiness), productivity and processability, more preferably in the range of 10% by weight to 60% by weight, and still more preferably in the range of 12% by weight to 40% by weight.

The polymer block A preferably has a weight-average molecular weight M in terms of polystyrene, measured by gel permeation chromatography (GPC), satisfying M≥20,000/[1+{a content % of (d-2)}/20] in view of a balance of various physical properties. Here, "a content % of (d-2)" is a content (weight %) of a vinyl aromatic monomer unit in a random copolymer block D to a content of a vinyl aromatic monomer unit in a hydrogenated block copolymer.

In the present invention, when a random copolymer block D is contained in a hydrogenated block copolymer, the content of a vinyl aromatic monomer unit necessary for a polymer block A is not necessarily required to be as much as in the case of containing no random copolymer block D, but the polymer block A is required to have a weight-average molecular weight M at least satisfying M≥20,000/[1+{a content % of (d-2)}/20] in view of a balance of various physical properties. On the other hand, when a hydrogenated block copolymer contains no random copolymer block D, the polymer block A is required to contain a vinyl aromatic monomer unit necessary for the hydrogenated block copolymer as a whole; and the polymer block A is required to have a weight-average molecular weight of 20,000 or more in view of a balance of various physical properties.

The hydrogenated block copolymer of the present invention preferably has a content of 1% by weight to 15% by weight of a polymer block B with respect to the total weight of the hydrogenated block copolymer. Since there is a feature of the conjugated diene monomer unit of the polymer block B having a greater part of unsaturated groups remaining, the polymer block B is preferably 15% by weight or less with respect to the total weight of the hydrogenated block copolymer in view of oxidative stability, thermal stability, productivity and processability. By contrast, the polymer block B is preferably 1% by weight or more in view of crosslinking reactivity. The polymer block B is more preferably in the range of 2% by weight to 10% by weight, and still more preferably in the range of 3% by weight to 7% by weight.

The polymer block C of the hydrogenated block copolymer of the present invention is a polymer block containing a conjugated diene monomer unit having 4 or more carbon atoms as a main component, and may be a random one; the conjugated diene monomer unit in the polymer block C may be uniformly distributed or nonuniformly distributed (for example, tapered distribution). Parts having uniform distribution and/or parts having nonuniform distribution may coexist in plural numbers in the polymer block C. The polymer block C is more preferably a complete block copolymer of four or more conjugated diene monomer units in view of improving compression set. In the present invention, the polymer block (C) in the hydrogenated block copolymer preferably has a vinyl bond amount of 15% to 80% in the whole conjugated diene, and preferably has a crystallinity of 10% or more.

The random copolymer block D of the present invention is a random copolymer block containing a conjugated diene monomer unit (d-1) having 4 or more carbon atoms and a vinyl aromatic monomer unit (d-2) as main components. The random copolymer block of the polymer block D preferably has a ratio of 30% by weight or more for a vinyl aromatic monomer unit (d-2), and more preferably 50% by weight or more in view of abrasion resistance. In the present invention, the polymer block D in the hydrogenated block copolymer preferably has a vinyl bond amount of 10% to 50% in the whole conjugated diene.

The polymer block C and the random copolymer block D in the hydrogenated block copolymer of the present invention both are preferably 0 to 85% by weight to the hydrogenated block copolymer. More preferably, the polymer block C and/or the random copolymer block D is 2 to 80% by weight, and the sum of the contents of the polymer block C and the random copolymer block D is preferably 25 to 85% by weight.

The hydrogenated block copolymer of the present invention preferably has a content of a vinyl aromatic monomer unit in the range of 10% by weight to 85% by weight, and more preferably in the range of 20% by weight to 70% by weight. The present invention has a feature that a hydrogenated block copolymer having an amount of a vinyl aromatic monomer unit in the range of 20% by weight to 40% by weight excels in a balance of oil resistance, compression set at high temperatures and elongation at break, and by contrast, that a hydrogenated block copolymer having an amount of a vinyl aromatic monomer unit in the range of 40% by weight to 70% by weight excels in low impact resilience, abrasion resistance and surface touch feeling.

In the present invention, the micro structure (ratios of cis, trans and vinyl) of conjugated diene monomer unit parts in a non-hydrogenated block copolymer can be changed optionally by use of polar compounds and the like described later; and when 1,3-butadiene is used as a conjugated diene, the 1,2-vinyl bond amount is generally 5 to 90% by weight, and when isoprene is used as a conjugated diene, the 3,4-vinyl bond amount is generally 3 to 80% by weight. In view of productivity, when 1,3-butadiene is used as a conjugated diene, the 1,2-vinyl bond amount is preferably 10 to 80% by weight, and more preferably 25 to 75% by weight; and when isoprene is used as a conjugated diene, the 3,4-vinyl bond amount is preferably 5 to 70% by weight.

In the present invention, "conjugated diene" is a diolefin having a pair of conjugated double bonds. Conjugated dienes contained in a polymer block B include, for example, isoprene, 2,3-dimethyl-butadiene, 2-methyl-1,3-pentadiene, myrcene, 2-methyl-1,3-pentadiene, 3-methyl-1,3-pentadiene, 4-methyl-1,3-pentadiene, 2-phenyl-1,3-butadiene, 2-phenyl-1,3-pentadiene, 3-phenyl-1,3-pentadiene, 2,3-dimethyl-1,3-pentadiene, 4-methyl-1,3-pentadiene, 2-hexyl-1,3-butadiene, 3-methyl-1,3-hexadiene, 2-benzyl-1,3-butadiene, 2-p-tolyl-1,3-butadiene and a mixture thereof, and one kind or two kinds or more thereof can be used, and isoprene is preferable. Conjugated dienes contained in polymer blocks C and D include, for example, 1,3-butadiene, 1,3-pentadiene, 2,4-hexadiene, 1,3-hexadiene, 1,3-heptadiene, 2,4-heptadiene, 1,3-octadiene, 2,4-octadiene, 3,5-octadiene, 1,3-nonadiene, 2,4-nonadiene, 3,5-nonadiene, 1,3-decadiene, 2,4-decadiene, 3,5-decadiene and a mixture thereof, and one kind or two kinds or more thereof can be used, and 1,3-butadiene is preferable; and a polymer block C is preferably a homoblock of conjugated diene in view of improving compression set. Conjugated dienes used for polymer blocks B, C and D preferably have 15 or less carbon atoms. Vinyl aromatic hydrocarbons include, for example, styrene, o-methylstyrene, p-methylstyrene, p-tert-butylstyrene, 1,3-dimethylstyrene, α-methylstyrene, vinylnaphthalene and vinylanthracene, and one kind or two kinds or more thereof can be used, and styrene is preferable.

As components other than the components as "main components" contained in the polymer blocks of the hydrogenated block copolymer of the present invention, all monomer species having anionic polymerizability are applicable.

The polymer block B of the hydrogenated block copolymer of the present invention has a hydrogenation rate of 50% or less of double bonds in a conjugated diene monomer unit being olefinic unsaturated double bonds in view of crosslinking reactivity. The hydrogenation rate is preferably 30% or less, more preferably 10% or less, and still more preferably 5% or less. Particularly, in a conjugated diene monomer unit being olefinic unsaturated double bonds contained in the polymer block B of the hydrogenated block copolymer of the present invention, preferably, 90% or more of 1,4-bonds remains unhydrogenated, and 50% of 3,4-bonds remains unhydrogenated. The polymer blocks C and D have a hydrogenation rate of 80% or more of double bonds in a conjugated diene monomer unit being olefinic unsaturated double bonds in view of oxidative stability, thermal stability and elongation at break. The hydrogenation rate is preferably 85% or more, more preferably 90% or more, and still more preferably 95% or more. The polymer blocks C and D may be structured by copolymerizing alkylenes, but hydrogenation of polyconjugated diene is desirable in view of productivity.

In the present invention, the content of a vinyl aromatic monomer unit in a hydrogenated block copolymer block can be determined by an ultraviolet spectrophotometer or the like. The content of a conjugated diene monomer unit, the vinyl bond content based on the conjugated diene monomer unit, and the hydrogenation rate can be determined by a nuclear magnetic resonance spectrometer (NMR). The molecular weight of a homopolymer block of a vinyl aromatic monomer unit is determined by measurement by an ultraviolet spectrophotometer and GPC of components of the homopolymer block (here, components of 30 or less in polymerization degree are excluded.) of the vinyl aromatic monomer unit obtained by decomposing a block copolymer before hydrogenation according to a method (I. M. Kolthoff, et al., J.P. Polym. Sci., 1, 429 (1946)) of oxidatively decomposing the block copolymer with di-tert-butyl hydroperoxide with osmium tetraoxide as a catalyst. The content can be determined by an ultraviolet spectrophotometer or the like.

The hydrogenated block copolymer of the present invention preferably has a weight-average molecular weight in terms of polystyrene, measured by GPC, of 30,000 to 2,000,000 in view of a balance of productivity, processability, mechanical strengths and compression set. That is more preferably 50,000 to 500,000, and still more preferably 80,000 to 300,000. In the present invention, the molecular weight distribution (Mw/Mn) (a ratio of a weight-average molecular weight (Mw) to a number-average molecular weight (Mn)) is preferably 10 or less, more preferably 1.01 to 5, and still more preferably 1.01 to 2 in view of a balance of processability and mechanical strengths. "Weight-average molecular weight" used in the present invention is a weight-average molecular weight determined by measurement by gel permeation chromatography (GPC) using a calibration curve (prepared by using peak molecular weights of standard polystyrenes) determined by measurement of commercially available standard polystyrenes. The molecular weight of a hydrogenated block copolymer can be determined similarly by measurement by GPC.

As methods of a manufacturing block copolymer, well-known methods can be used, and they include, for example, methods described in JP-B-36-19286, JP-B-43-17979, JP-B-46-32415, JP-B-49-36957, JP-B-48-2423, JP-B-48-4106, JP-B-56-28925, JP-B-51-49567, JP-A-59-166518 and JP-A-60-186577.

In the present invention, a block copolymer before hydrogenation can be obtained, for example, by living anionic polymerization in a hydrocarbon solvent using an initiator such as an organic alkali metal compound. Usable hydrocarbon solvents include, for example, aliphatic hydrocarbons such as butane, pentane, hexane, isopentane, heptane, octane and isooctane, alicyclic hydrocarbons such as cyclopentane, methylcyclopentane, cyclohexane, methylcyclohexane and ethylcyclohexane, and aromatic hydrocarbons such as benzene, toluene, ethylbenzene and xylene. These may be used singly or as a mixture of two or more.

Initiators to be used include aliphatic hydrocarbon alkali metal compounds, aromatic hydrocarbon alkali metal compounds and organic amino alkali metal compounds, which are known to generally have an anionic polymerization activity to conjugated diene compounds and vinyl aromatic compounds, wherein suitable alkali metals include lithium, sodium and potassium. Most suitable organic alkali metal compounds include C1-20 aliphatic and aromatic hydrocarbon lithium compounds, including compounds containing one lithium atom in one molecule, and compounds containing a plurality of lithium atoms in one molecule such as dilithium, trilithium and tetralithium compounds. They specifically include n-propyllithium, n-butyllithium, sec-butyllithium, tert-butyllithium, n-pentyllithium, n-hexyllithium, benzyllithium, phenyllithium, tolyllithium, a reaction product of diisopropenylbenzene and sec-butyllithium and a reaction product of divinylbenzene, n-butyllithium, sec-butyllithium and a small amount of 1,3-butadiene.

Organic alkali metal compounds disclosed in U.S. Pat. No. 5,708,092, GB Patent No. 2,241,239, U.S. Pat. No. 5,527,753 and the like can further be used. An organic alkali metal compound may be added separately once or more times in the course of polymerization during production of the block copolymer.

In the present invention, when a conjugated diene compound and a vinyl aromatic compound are copolymerized using an organic alkali metal compound as a polymerization initiator, for regulating the amount of vinyl bonds (1, 2 or 3,4 bond) originated from the conjugated diene compound incorporated in a polymer, and regulating the random copolymerizability of the conjugated diene compound and the vinyl aromatic compound, a tert-amine compound or an ether compound can be added as a regulator. The tert-amine compound is a compound represented by the general formula R1R2R3N (here, R1, R2 and R3 are a hydrocarbon group having 1 to 20 carbon atoms, or a hydrocarbon group having a tert-amino group). The compound is, for example, trimethylamine, triethylamine, tributylamine, N,N-dimethylaniline, N-ethylpiperidine, N-methylpyrrolidine, N,N,N',N'-tetramethylethylenediamine, N,N,N',N'-tetraethylethylenediamine, 1,2-dipiperidinoethane, trimethylaminoethylpiperazine, N,N,N',N",N"-pentamethylethylenetriamine and N,N'-dioctyl-p-phenylenediamine.

The ether compound is selected from straight-chain ether compounds and cyclic ether compounds. The straight-chain ether compounds include dialkyl ether compounds of ethylene glycols such as dimethyl ether, diethyl ether, diphenyl ether, ethylene glycol dimethyl ether, ethylene glycol diethyl ether and ethylene glycol dibutyl ether, and dialkyl ether compounds of diethylene glycols such as diethylene glycol dimethyl ether, diethylene glycol diethyl ether and diethylene glycol dibutyl ether. The cyclic ether compounds include tetrahydrofuran, dioxane, 2,5-dimethyl oxolane, 2,2,5,5-tetramethyloxolane, 2,2-bis(2-oxolanyl)propane and alkyl ethers of furfuryl alcohol.

In the present invention, a method of copolymerizing a conjugated diene compound and a vinyl aromatic compound using an organic alkali metal compound as a polymerization initiator may be a batch polymerization process, a continuous polymerization process or a combination thereof. The polymerization temperature is generally 0° C. to 180° C., and preferably 30° C. to 150° C. A time required for polymerization depends on conditions, but is usually 48 hours or less, and most suitably 0.1 to 10 hours. The atmosphere for the polymerization system is preferably an inert gas atmosphere such as nitrogen gas. The polymerization pressure is not especially limited as long as the pressure is in the pressure range enough to maintain a monomer and a solvent in liquid phases in the above temperature range. Further, attention must be paid for impurities inactivating a catalyst and a living polymer, such as water, oxygen and carbon dioxide gas, not to contaminate the polymerization system.

In the present invention, a necessary amount of a di- or higher functional coupling agent can be added at the finishing time of the above-mentioned polymerization to carry out a coupling reaction. The difunctional coupling agent may be any well-known one, and is not especially limited. It includes, for example, dihalogen compounds such as dibromoethane, dichloroethane, dimethyldichlorosilane and dimethyldibromosilane, and acid esters such as methyl benzoate, ethyl benzoate, phenyl benzoate and phthalates. Tri- or higher functional coupling agents may be any well-known ones, and are not especially limited. They include, for example, tri- or higher hydric alcohols, epoxidized soybean oils, polyvalent epoxy compounds such as diglycidylbisphenol A, halogenated silicon compounds represented by the general formula $R_{4-n}SiX_n$ (here, R denotes a hydrocarbon group having 1 to 20 carbon atoms; X denotes a halogen; and n is an integer of 3 to 4), for example, methylsilyl trichloride, t-butylsilyl trichloride, silicon tetrachloride and bromides thereof and the like, halogenated tin compounds represented by the general formula $R_{4-n}SnX_n$ (here, R denotes a hydrocarbon group having 1 to 20 carbon atoms; X denotes a halogen; and n is an integer of 3 to 4), for example, polyhalogen compounds such as methyltin trichloride, t-butyltin trichloride and tin tetrachloride, polyalkoxysilane compounds such as tetramethoxysilane and tetraethoxysilane, and dimethyl carbonate and diethyl carbonate.

In the present invention, a hydrogenated product of a block copolymer is obtained by hydrogenating the block copolymer obtained as described above. Since the present invention has a feature that the block copolymer comprises two or more conjugated dienes and one kind of the conjugated dienes are selectively hydrogenated, a hydrogenation catalyst is not especially limited, for example, as long as the catalyst has such a selectivity that butadiene is selectively and substantially completely hydrogenated and isoprene has a sufficient unsaturation degree. For example, the catalyst includes homogeneous hydrogenation catalysts of organometal compounds of Ti, Ru, Rh, Zr or the like. A specific hydrogenation catalyst usable is a hydrogenation catalyst described in JP-B-2-9041. Preferable hydrogenation catalysts include titanocene compounds and/or mixture thereof with reductive organometal compounds.

A titanocene compound usable is a compound described in JP-A-8-109219, and titanocene compounds include, as specific examples, compounds having at least one ligand having a (substituted) cyclopentadienyl skeleton such as biscyclopentadienyltitanium dichloride or monopentamethylcyclopentadienyltitanium trichloride, an indenyl skeleton, or a fluorenyl skeleton. Reductive organometal compounds include organic alkali metal compounds such as organolithium compounds, organomagnesium compounds, organoaluminum compounds, organoboron metal compounds and organozinc compounds.

In the present invention, the hydrogenation reaction is carried out generally in the temperature range of 0 to 200° C., and more preferably 30 to 150° C. The hydrogen pressure used in the hydrogenation reaction is recommended to be 0.1 to 15 MPa, preferably 0.2 to 10 MPa, and more preferably 0.3 to 5 MPa. The hydrogenation reaction time is usually 3 min to 10 hours, and preferably 10 min to 5 hours. The hydrogenation reaction can use any of a batch process, a continuous process and a combination thereof.

A catalyst residue is, as required, removed from a solution of a hydrogenated block copolymer obtained as described above, and the hydrogenated block copolymer can be separated from the solution. Methods of separating a solvent include, for example, a method in which a polar solvent being a poor solvent to the hydrogenated copolymer, such as acetone or an alcohol, is added to a reaction liquid after hydrogenation, and recovered by precipitating a polymer, a method in which a reaction liquid is charged in a hot water under stirring, and the solvent is removed and recovered by steam stripping, and a method in which a polymer solution is directly heated to distill out a solvent. To the hydrogenated block copolymer of the present invention, various types of stabilizers can be added, such as phenolic stabilizers, phosphorus stabilizers, sulfur stabilizers and amine stabilizers.

The hydrogenated block copolymer of the present invention can be functionalized by reacting a polymer block B containing a remaining unsaturated group with a functional group-containing compound. Functional groups are, for example, a hydroxyl group, a carbonyl group, a thiocarbonyl group, an acid halide group, an acid anhydride group, a carboxyl group, a thiocarboxylic acid group, an aldehyde group, a thioaldehyde group, a carboxylate group, an amide group, a sulfonic acid group, a sulfonate group, a phosphoric acid group, a phosphate group, an amino group, an imino group, a cyano group, a pyridyl group, a quinoline group, an epoxy group, a thioepoxy group, a sulfide group, an isocyanate group, an isothiocyanate group, a halogenated silicon group, a silanol group, an alkoxysilane group, a halogenated tin group, an alkoxytin group and a phenyltin group. Above all, suitable are a hydroxyl group, a carbonyl group, an acid anhydride group, a carboxyl group, an epoxy group, a silanol group and the like.

Methods of reacting a hydrogenated block copolymer with the functional group-containing compound include a method in which the hydrogenated block copolymer is heated and melted (100 to 300° C.) to react it with the functional group-containing compound, and a method in which the hydrogenated block copolymer rendered in a solution state or a slurry state by using a solvent is reacted with the functional group-containing compound at 0° C. to 150° C.

For example, manufacturing methods for epoxidizing include a method described in JP-A-6-220124 and the like, in which a hydrogenated block copolymer can be reacted with an epoxidizing agent such as peroxy acids or hydroperoxides. Peroxy acids to be used are performic acid, peracetic acid, perbenzoic acid, trifluoroperacetic acid and the like. Among them, peracetic acid is manufactured industrially in a large amount, inexpensively available, and highly stable, so it is preferable. As hydroperoxides, there are hydrogen peroxide, tertiarybutyl hydroperoxide, cumene peroxide and the like. On epoxidizing, as required, a catalyst can be used. For example, in the case of peracids, an alkali such as sodium carbonate, or an acid such as sulfuric acid may be used as a catalyst. In the case of hydroperoxides, concurrent use of a mixture of tungstic acid and caustic soda, and hydrogen peroxide, an organic acid and hydrogen peroxide, or molybdenum hexacarbonyl and tertiarybutyl hydroperoxide can provide a catalytic effect. The epoxidizing reaction is carried out by regulating the presence/absence of a solvent and the reaction temperature depending on the apparatus and physical properties of raw materials. The reaction temperature range usable is determined by the reactivity of an epoxidizing agent to be used. In the case of peracetic acid as a preferable epoxidizing agent, the reaction temperature is preferably 0 to 70° C. With the temperature of less than 0° C., the reaction is slow; and with that exceeding 70° C., peracetic acid decomposes.

Manufacturing methods for incorporating an acid anhydride group include a method described in JP-A-62-79211, in which a hydrogenated block copolymer can be graft-modified with an α,β-unsaturated carboxylic acid, or its derivative such as its anhydride, its esterified substance, its amidated substance or its imidized substance. Specific examples of α,β-unsaturated carboxylic acid, or its derivative include maleic anhydride, maleic anhydride imide, acrylic acid and its esters, methacrylic acid and its esters, and endo-cis-bicyclo[2.2.1]-5-heptene-2,3-dicarboxylic acid and its anhydride. The addition amount of the α,β-unsaturated carboxylic acid or its derivative is generally 0.01 to 20 parts by weight, and preferably 0.1 to 10 parts by weight, with respect to 100 parts by weight of a hydrogenated polymer.

In the present invention, the reaction temperature in the case of graft modification is preferably 100 to 300° C., and more preferably 120 to 280° C.

A composition of the functionalized hydrogenated block copolymer of the present invention and a polar thermoplastic resin (hereinafter, referred to as functionalized hydrogenated block copolymer resin composition) has impact resistance, oil resistance and flexibility. The functionalized hydrogenated block copolymer resin composition is preferably a composition comprising a functionalized hydrogenated block copolymer (component (E)) and a polar thermoplastic resin (component (F)) reactive with the component (E) and/or a functional group-containing rubbery polymer (component (F)) reactive with the component (E). Polar thermoplastic resins as the component (F) include polyester resins, polyamide resins, polycarbonate resins, polyurethane resins, polyphenylene ether resins and polyoxymethylene resins, and functional group-containing rubbery polymers as the component (F) include functional group-containing polyethylene polymers, functional group-containing polypropylene resins and functional group-containing polyester resins.

In the composition including the component (E) and the component (F) described above, the component (E) is preferably 1 to 99% by weight with respect to 100 parts by weight of the total of the component (E) and the component (F), but for providing a composition having flexible and favorable rubbery characteristics, the component (E) is more preferably 60 to 99% by weight, and still more preferably 70 to 90% by weight. For providing a composition having a high rigidity and an excellent impact resistance, the component (E) is more preferably 1 to 40% by weight, and still more preferably 5 to 30% by weight.

The crosslinking composition of the present invention comprises, at least, an unfunctionalized hydrogenated block copolymer or a functionalized hydrogenated block copolymer containing residual unsaturated groups, and a thermoplastic resin and a crosslinking agent. The crosslinking composition may be crosslinked, for example, through sulfur crosslinking, peroxide crosslinking, metallic ion crosslinking or silane crosslinking by a well-known method. The (functionalized) hydrogenated block copolymer of the present invention is mixed with a specific amount of a thermoplastic resin such as polyolefin, and if needed, a rubber softener, and further with a crosslinking agent to dynamically crosslink the mixture, thereby providing a thermoplastic elastomer composition providing molded products having excellent strain resilience at high temperatures and favorable rubbery characteristics. For example, the dynamic crosslinking composition of the present invention preferably has a content rate of a thermoplastic resin of 10 to 300 parts by weight, more preferably 15 to 200 parts by weight, and still more preferably 20 with respect to 100 parts by weight, with respect to 100 parts by weight of a (functionalized) hydrogenated block copolymer. The content rate of a thermoplastic resin being 10 to 300 parts by weight results in that the thermoplastic resin makes a continuous phase in the dynamic crosslinking composition; the dynamic crosslinking composition has a morphology in which a (functionalized) hydrogenated block copolymer crosslinked at least through polymer block B parts is dispersed in a microparticle form in the continuous phase; and strain resilience at high temperatures, flexible rubbery characteristics and favorable moldability are imparted to the thermoplastic elastomer composition.

With the content rate of the thermoplastic resin of less than 10 parts by weight described above, the obtained dynamic crosslinking composition gives an insufficient thermoplasticity and is inferior in moldability; by contrast, with that exceeding 300 parts by weight described above, the obtained dynamic crosslinking composition gives an insufficient flexibility.

Ethylenic polymers preferably used as thermoplastic resins include, for example, homopolymers of ethylene such as high density polyethylenes, medium density polyethylenes and low density polyethylenes, and ethylene copolymers such as ethylene•butene-1 copolymers, ethylene•hexene copolymers, ethylene•eptene copolymers, ethylene•octene copolymers, ethylene•4-methylpentene-1 copolymers, ethylene•vinyl acetate copolymers, ethylene•acrylic acid copolymers, ethylene•acrylate copolymer, ethylene•methacrylic acid copolymers and ethylene•methacrylate copolymers. Above all, high density polyethylenes, medium density polyethylenes and/or low density polyethylenes are preferably used in view of moldability.

Propylenic polymers preferably used as polyolefins include, for example, propylene homopolymers, ethylene•propylene random copolymers, ethylene•propylene block copolymers, propylene•butene-1 copolymers, propylene•ethylene•butene-1 copolymers and propylene•4-methylpentene-1 copolymers. Above all, propylene homopolymers, ethylene•propylene random copolymers and/or ethylene•propylene block copolymers are preferably used in view of moldability.

The kind of a rubber softener optionally contained in the dynamic crosslinking composition of the present invention is not especially limited, and any of mineral oil softeners and/or synthetic resin softeners can be used. Mineral oil softeners are generally a mixture of an aromatic hydrocarbon, a naphthenic hydrocarbon and a paraffinic hydrocarbon, and ones in which the number of carbon atoms of a paraffinic hydrocarbon accounts for 50% or more in the total carbon atoms are named paraffinic oils; ones in which the number of carbon atoms of a naphthenic hydrocarbon accounts for 30 to 45% therein are named naphthenic oils; and ones in which the number of carbon atoms of an aromatic hydrocarbon accounts for 35% or more therein are named aromatic oils. Among them, rubber softeners suitably used in the present invention are paraffinic oils. Paraffinic oils preferably used have a kinetic viscosity at 40° C. of 20 to 800 cst (centistokes), especially 50 to 600 cst, a fluidity degree of 0 to −40° C., especially 0 to −30° C., and a flashing point (COC method) of 200 to 400° C., especially 250 to 350° C. The synthetic resin softeners include polybutenes and low-molecular polybutadienes, either of which can be used. The rubber softener is preferably contained in a proportion of 0 to 300 parts by weight with respect to 100 parts by weight of a hydrogenated block copolymer. With the content rate of the rubber softener component exceeding 300 parts by weight described above, the rubber softener causes bleeding-out, and the mechanical properties of dynamic crosslinking compositions and moldings made thereof decrease.

As a crosslinking agent, conventionally well-known crosslinking agents can be utilized. They include, for example, organic peroxides, sulfur-based compounds, phenol resin compounds, quinoid compounds, bismaleimide compounds, isocyanate compounds, thiuram compounds, morpholine disulfide and hydrosilicone compounds. These can be used concurrently with a crosslinking aid, a cocrosslinking agent, a vulcanizing accelerator and the like, such as stearic acid, oleic acid, zinc stearate and zinc oxide. As crosslinking agents, phenol resin compounds, quinoid compounds and bismaleimide compounds are preferable in view that they act selectively on unsaturated groups of a polymer block B, and they give a favorable break elongation. When a hydrogenated block copolymer has been functionalized, depending on the kinds of functional groups a polymer block B has, a compound used as a crosslinking agent is a compound having reactive groups to react with the respective functional groups to form crosslinking bonds. Preferable as a crosslinking agent of a compound having the reactive groups is a crosslinking agent having 2 or more, especially 3 or more, functional groups selected from a carboxyl group, an acid anhydride group, an isocyanate group, an epoxy group, an amino group, a silanol group and an alkoxysilane group. Further, physical crosslinking methods by electron beams, radiation rays or the like can be used. The use amount of a crosslinking agent varies depending on crosslinking methods. For example, in the case of crosslinking unsaturated groups of a polymer block B, the use amount is preferably 0.01 to 30 parts by weight, and more preferably 0.01 to 20 parts by weight, with respect to 100 parts by weight of a hydrogenated block copolymer. With the use amount of a crosslinking agent of less than 0.01 part by weight described above, the polymer block B cannot have sufficient crosslinking bonds formed; by contrast, with that exceeding 30 parts by weight described above, bleeding-out of the rubber softener and decrease in mechanical properties are caused. In the case of crosslinking the functional groups of a polymer block B, considering a use amount of a crosslinking agent from the equivalent weight of the functional groups, the use amount of the crosslinking agent is preferably in a proportion of 0.1 to 100 equivalents, more preferably 0.1 to 10 equivalents, to 1 equivalent of a functional group the polymer block B has.

Methods of manufacturing the functionalized hydrogenated block copolymer resin composition and the dynamic crosslinking composition of the present invention are not especially limited, and conventional well-known methods can be utilized. Usable apparatuses are any of melting and kneading apparatuses capable of homogeneously mixing each component, and examples thereof include a single screw extruder, a twin screw extruder, a kneader and a Banbury mixer. Above all, preferably used is a twin screw extruder which provides a large shearing force during kneading and can be operated continuously. "Melting and kneading" means mixing in the state that a composition melts at a temperature of the melting point or above of the composition, and the temperature is preferably 100 to 300° C., and more preferably 150 to 270° C.

The functionalized hydrogenated block copolymer and its composition of the present invention are excellent in tackiness and adhesiveness. Hereinafter, a composition containing the functionalized hydrogenated block copolymer of the present invention is treated as an adhesive composition. Only addition of a functional group selected from a hydroxyl group, a carbonyl group, an acid anhydride group, a carboxyl group, an amide group, a sulfonic group, an amino group, a cyano group, an epoxy group, an isocyanate group, a silanol group, an alkoxysilane group and the like to a hydrogenated block copolymer can provide an adhesiveness high to polar resins and metals. With respect to the high adhesiveness, a primer (adhesion imparting layer (adhesive intermediate layer) may be applied on polar resins and metal layers for improving the adhesiveness. An adhesive composition may be used as an adhesive intermediate layer, and another resin may be further coated thereon as an outer layer.

The adhesive composition of the present invention may use a functionalized hydrogenated block copolymer singly, or may be a mixed composition with other components as long as the functionalized hydrogenated block copolymer is 10% by weight or more. The other components include, for example, plasticizers such as phthalates and adipates, rubber softeners, tackifier resins, fillers and reinforcing agents such as carbon, silica, talc and glass fibers, and additionally antioxidants, ultraviolet absorbents, antistatic agents, flame retarders, lubricants, foaming agents, coloring materials, pigments, nucleating agents, and further mixtures thereof. As required otherwise, rubbery polymers can be added, such as styrene•butadiene rubber (SBR), nitrile rubber (NBR), butadiene rubber (BR), ethylene•propylene rubber (EPT, EPR), natural rubber (NR), isoprene rubber (IR), 1,2-polybutadiene, acrylic rubber (AR), chloroprene rubber (CR) and butyl rubber (IIR). Further, thermoplastic resins can be formulated, such as dienic resins, polyvinyl chloride resins, polyvinyl acetate resins, polycarbonate resins, polyacetal resins, polyamide resins, polyester resins, polyether resins, polysulfones and polyphenylene sulfides. For improving high-frequency fusion bondability, methods are included in which polar resins such as ethylene-vinyl acetate copolymers, ionomers and polyvinyl chlorides and fillers having a hydroxyl group are mixed. Particularly, an ethylene-vinyl acetate copolymer which permits high-frequency fusion bonding preferably has a melt index of 0.2 to 400 g/10 min (190° C., 2.16 kg load), and more preferably 0.5 to 50 g/10 min. The formulation amount of an ethylene-vinyl acetate copolymer in the composition is preferably 10% by weight or more in view of high-frequency fusion bondability. By contrast, 90% by weight or less is preferable in view of flexibility. The amount is more preferably in the range of 10% by weight to 80% by weight, and still more preferably 15% by weight to 80% by weight.

To the hydrogenated block copolymer, the functionalized hydrogenated block copolymer resin composition, the adhesive composition or the dynamic crosslinking composition of the present invention, any filler and flame retardant can be formulated as required. The filler and the flame retardant are not especially limited as long as they are generally used for formulation of thermoplastic resins and rubbery polymers.

Fillers are exemplified by inorganic fillers such as silica, calcium carbonate, magnesium carbonate, magnesium hydroxide, aluminum hydroxide, calcium sulfate, barium sulfate, carbon black, glass fibers, glass beads, glass balloons, glass flakes, graphite, titanium oxide, potassium titanate whiskers, carbon fibers, alumina, kaolin clay, silicic acid, calcium silicate, quartz, mica, talc, clay, zirconia, potassium titanate, alumina and metal particles, and organic fillers such as woodenchips, wooden powder and pulp. Their shapes assume scaly, spherical, granular, powdery, amorphous or other shapes, and are not especially limited. These can be used singly or in combination of two or more.

Then, the flame retardants include halogen-based compounds containing bromine and the like, and phosphorus-based compounds such as phosphorus-based aromatic compounds, and phosphate-based compounds, and metal hydroxides, but in recent years, inorganic flame retardants have been preferably used because of environmental problems and the like. Inorganic flame retardants are exemplified mainly by hydrous metal compounds and the like, including metal hydroxides such as magnesium hydroxide, aluminum hydroxide and calcium hydroxide, metal oxides such as zinc borate and barium borate, and others such as calcium carbonate, clay, basic magnesium carbonate and hydrotalcite. In the present invention, among the above-mentioned flame retardants, preferable flame retardants are metal hydroxides such as magnesium hydroxide and phosphorus-based compound flame retardants in view of improving flame retardancy. Flame retardants may be used which themselves have a low flame retardancy developing effect, but exhibit a synergistically excellent effect by concurrently using other compounds; or a well-known flame retardant and a well-known flame retardant aid may be used in combination.

Fillers and flame retardants of a type in which their surface is surface treated in advance with a surface treating agent may be used. These fillers and flame retardants may be used concurrently in two or more types. Concurrent use is not especially limited, and may be that of filler components, that of flame retardant components, or that of a filler and a retardant.

To the functionalized hydrogenated block copolymer resin composition, the adhesive composition or the dynamic crosslinking composition of the present invention, additives or mixtures thereof described in "RUBBER AND PLASTICS FORMULATION CHEMICALS" (edited by Rubber Digest Co., Ltd.) may be added as required.

For providing foamed moldings and crosslinked foamed moldings of the hydrogenated block copolymer, the functionalized hydrogenated block copolymer resin composition, the adhesive composition or the dynamic crosslinking composition of the present invention, any well-known methods such as chemical methods and physical methods may be used, in which the addition of a foaming agent such as a chemical foaming agent or a physical foaming agent of an inorganic foaming agent, an organic foaming agent or the like enables air bubbles to be distributed inside a material. Making foaming materials allow for achievement of weight reduction, and improvements in flexibility, impact absorptivity and designability. The inorganic foaming agents are exemplified by sodium bicarbonate, ammonium carbonate, ammonium bicarbonate, ammonium nitrite, azide compounds, sodium borohydride and metal powders.

The organic foaming agents are exemplified by azodicarbonamide, azobisformamide, azobisisobutyronitrile, barium azodicarboxylate, N,N'-dinitrosopentamethylenetetramine, N,N'-dinitroso-N,N'-dimethylterephthalamide, benzene sulfonyl hydrazide, p-toluene sulfonyl hydrazide, p,p'-oxybisbenzene sulfonyl hydrazide and p-toluene sulfonyl semicarbazide.

The physical foaming agents, are exemplified by hydrocarbons such as pentane, butane and hexane, halogenated hydrocarbons such as methyl chloride and methylene chloride, gases such as nitrogen and air, and fluorinated hydrocarbons such as trichlorofluoromethane, dichlorodifluoromethane, trichlorotrifluoroethane, chlorodifluoroethane and hydrofluorocarbons.

On surfaces of moldings of the hydrogenated block copolymer, the functionalized hydrogenated block copolymer resin composition, the adhesive composition or the dynamic crosslinking composition of the present invention, for improving external appearance, weather resistance, scratch resistance and the like as required, decorations such as printing, painting and texturing can be applied. In the case of carrying out surface treatment for improving printability, paintability and the like, methods of the surface treatment are not especially limited, and physical methods, chemical methods and the like can be used. For example, they include corona discharge treatment, ozone treatment, plasma treatment, flame treatment and acid and alkali treatments. Above all, corona discharge treatment is preferable in view of its easy implementation, its cost and possible continuous treatment.

The hydrogenated block copolymer, the functionalized hydrogenated block copolymer resin composition, the adhesive composition or the dynamic crosslinking composition of the present invention can be used for various applications by formulating various types of additives as desired.

With respect to specific modes of the hydrogenated block copolymer, the functionalized hydrogenated block copolymer resin composition, the adhesive composition or the dynamic crosslinking composition of the present invention, they can suitably be used for (i) reinforcing filler formulations, (ii) crosslinked products, (iii) foamed products, (iv) moldings such as multilayer films and multilayer sheets, (v) building materials, (vi) vibration damping and soundproof materials, (vii) wire coating materials, (viii) high-frequency fusion bonding compositions, (ix) slush molding materials, (x) tacky and adhesive compositions, (xi) asphalt compositions, (xii) medical tools, (xiii) automotive materials, and the like.

The hydrogenated block copolymer, the functionalized hydrogenated block copolymer resin composition, the adhesive composition or the dynamic crosslinking composition of the present invention can be used for various applications as described above, but in the case where they are used for molded products, molding methods usable are extrusion molding, injection molding, blow molding, pressure molding, vacuum molding, foam molding, multilayer extrusion molding, multilayer injection molding, high-frequency fusion molding, slush molding, calender molding, and the like. Examples of molded products include sheets, films, tubes, nonwoven fabric and fibrous molded products, and synthetic leathers. Molded products formed of the hydrogenated copolymer and the hydrogenated copolymer composition of the present invention can be utilized for food packaging materials, medical tool materials, household appliances and their parts, electronic devices and their components, autoparts, industrial parts, household commodities, materials for toys and the like, materials for footwear, fiber materials, materials for adhesives, asphalt modifiers and the like.

Specific examples of autoparts include side moldings, grommets, knobs, weather strips, sashes and their sealing materials, armrests, door grips, handle grips, console boxes, headrests, instrument panels, bumpers, spoilers and storage covers for air bag devices. Specific examples of medical tools include blood bags, platelet preservation bags, infusion solution (drug solution) bags, bags for artificial dialysis, medical tubes and catheters. The molded products can be used further for industrial or foodstuff tubes, cleaner hoses, packing for electric refrigerators, various covering materials for electric wire and others, covering materials for grips, flexible dolls, adhesive tape-, sheet- and film-substrates, surface protection film-substrates and adhesives for the films, adhesives for carpets, films for stretch packaging, thermally shrinkable films, coating materials for coated steel pipes, sealants and the like.

EXAMPLES

Hereinafter, the present invention will be described more specifically by way of Examples and Comparative Examples, but the scope of the present invention is not limited thereto.

In Examples below, characteristics and physical properties of polymers were measured as follows.

I. Compositions of Hydrogenated Block Copolymers and Evaluation of Structures Thereof I-1) The Styrene Content of a Hydrogenated Block Copolymer The styrene content was measured using a non-hydrogenated block copolymer by an ultraviolet spectrophotometer (made by Shimadzu Corp., UV-2450).

I-2) The Polystyrene Block Content of a Hydrogenated Block Copolymer

The polystyrene block content was measured using a non-hydrogenated block copolymer by the osmium tetraoxide oxidative decomposition method described in I. M. Kolthoff, et al., J. Polym. Sci. 1, 429 (1946). For decomposition of a copolymer, a tert-butanol solution of osmic acid of 0.1 g/125 ml was used.

I-3) The Vinyl Bond Amount of a Hydrogenated Block Copolymer

The vinyl bond amount was measured using a non-hydrogenated block copolymer by an infrared spectrophotometer (made by JASCO Corp., FT/1R-230). The vinyl bond amount of a block copolymer was calculated by the Hampton method.

I-4) The Molecular Weight and the Molecular Weight Distribution of a Hydrogenated Block Copolymer These were measured by GPC (apparatus: Tosoh Corp., HLC-8220; column: TSGel SuperH-RC×two columns; solvent: tetrahydrofuran; concentration: 0.5 g/l; flow rate: 60 ml/hr; temperature: 35° C.). The weight-average molecular weight in terms of polystyrene was determined using a calibration curve prepared using commercially available standard polystyrenes whose weight-average molecular weights and number-average molecular weights are known. The molecular weight distribution was a ratio of a weight-average molecular weight (Mw) and a number-average molecular weight (Mn).

I-5) The Hydrogenation Rate of Double Bonds of a Conjugated Diene Monomer Unit in a Hydrogenated Block Copolymer, and the Isoprene Content These were measured using a hydrogenated block copolymer with a nuclear magnetic resonance spectrometer (DPX-400, made by Bruker Corp. (Germany)).

I-6) The Epoxy-Modified Amount of an Epoxidized Hydrogenated Block Copolymer

The epoxy-modified amount was determined using an epoxidized hydrogenated block copolymer after modification, which was titrated with a perchloric acid-acetic acid solution, according to JIS K7236-2001 "Determination of epoxy equivalent in epoxy resins".

II. Physical Properties of Hydrogenated Block Copolymer Compositions

II-1) Hardness

The hardness was measured as a value after 10 sec by a durometer type A according to JIS K6253.

I-2) Tensile Stress, Tensile Strength and Elongation at Break

These were measured using dumbbell No. 3 at a crosshead speed of 500 mm/min according to JIS K6251.

II-3) Heat Resistance

The compression set test was carried out according to JIS K6262. The measuring conditions were at temperatures of 70° C., 100° C. and 120° C. for 22 hours.

II-4) Dunlop Impact Resilience

The impact resilience was measured according to BS903.

II-5) Abrasion Resistance 1 (Measurement of Texture Depth Remaining Rate)

The molded sheet surface (skin-textured surface, texture depth: about 90 μm) was rubbed using a Color Fastness Rubbing Tester (Japan Society for the Promotion of Science (JSPS) type rubbing tester, made by Tester Sangyo Co., Ltd., model: AB-301) with a friction cloth, Canequim No. 3 cotton cloth, and at a load of 500 g, and thereafter, the texture depth was measured to judge the abrasion resistance 1 by the texture depth remaining rate (calculated by the expression 1 described below) under the following standard. The texture depth was measured by a surface roughness tester, E-35A, made by Tokyo Seimitsu Co., Ltd.

The texture depth remaining rate=(texture depth after friction)/(texture depth before friction)×100   (Expression 1)

⊚ (excellent): a texture depth remaining rate of 75% or more after 20,000 of number of times of friction ○ (good): a texture depth remaining rate of less than 75% and 50% or more after 20,000 of number of times of friction Δ (fair): a texture depth remaining rate of less than 50% and 25% or more after 20,000 of number of times of friction X (bad): a texture depth remaining rate of less than 25% after 20,000 of number of times of friction II-6) Abrasion Resistance 2 (Surface State after Friction)

The sheet surface after the JSPS rubbing test described in the above 12) was touched with the finger to confirm the presence/absence of tackiness feeling, which was judged by the following standard.

○ (good): no tackiness after the finish of friction

Δ (fair): slight tackiness after the finish of friction

X (bad): tackiness after the finish of friction

II-7) Surface Feeling

A press sheet of 2 mm in thickness was fabricated and the sheet surface was touched with the finger to confirm the presence/absence of tackiness feeling, which was judged by the following standard.

○ (good): no tackiness of the sheet surface

X (bad): tackiness of the sheet surface

II-8) Oil Resistance

A press sheet of 2 mm in thickness as a specimen was fabricated. The weight change rate of 24 hours at 120° C. using IRM#903 oil was measured.

⊚ (excellent): a weight change rate of 100% or less

○ (good): a weight change rate of 100% to 150%

Δ (fair): a weight change rate of 150% to 200%

X (bad): a weight change rate of 200% or more

The formulated components are as follows.

<Preparation of a Hydrogenation Catalyst>

A hydrogenation catalyst used for hydrogenation reaction of a block copolymer was prepared by a method described below.

1 L of dried and purified cyclohexane was charged in a reaction vessel whose atmosphere was replaced by nitrogen; 100 mmol of biscyclopentadienyltitanium dichloride was added thereto, and n-hexane containing 200 mmol of trimethylaluminum was added thereto under full stirring; and the mixture was reacted at ambient temperature for about 3 days.

[Preparation of a Hydrogenated Block Copolymer]

<Polymer 1: A Hydrogenated Product of Styrene-Isoprene-Butadiene-Isoprene-Styrene>

Batch polymerization was carried out using a reactor tank of 10 L in internal volume with a stirring apparatus and a jacket, whose interior was washed, dried and replaced by nitrogen. First, a cyclohexane solution containing 14 parts by weight of styrene (concentration: 20% by weight) was charged. Then, 0.06 part by weight of n-butyllithium based on 100 parts by weight of the whole monomers and 0.45 mol of N,N,N',N'-tetramethylethylenediamine based on 1 mol of n-butyllithium were added thereto, and polymerized at 70° C. for 30 min. Thereafter, a cyclohexane solution containing 2 parts by weight of isoprene (concentration: 20% by weight) was added thereto, and polymerized at 70° C. for 30 min. Then, a cyclohexane solution containing 68 parts by weight of butadiene (concentration: 20% by weight) was added thereto, and polymerized at 70° C. for 1 hour. Then, a cyclohexane solution containing 2 parts by weight of isoprene (concentrate: 20% by weight) was added thereto, and polymerized at 70° C. for 30 min. Finally, a cyclohexane solution containing 14 parts by weight of styrene (concentrate: 20% by weight) was added thereto, and polymerized at 70° C. for 30 min. The obtained polymer had a styrene content of 28% by weight, a polystyrene block content of 28% by weight, an isoprene content of 4% by weight, a vinyl bond amount of a polybutadiene block part of 35% by weight, a molecular weight of the entire polymer of 223,000, a molecular weight of the polystyrene block of 21,000, and a molecular weight distribution of 1.03.

Next, 100 ppm of the above-mentioned hydrogenation catalyst in terms of titanium was added based on 100 parts by weight of the obtained polymer, and hydrogenation reaction was carried out at a hydrogen pressure of 0.7 MPa and at a temperature of 65° C. Thereafter, methanol was added and then 0.3 part by mass of octadecyl-3-(3,5-di-t-butyl-4-hydroxyphenyl)propionate as a stabilizer based on 100 parts by mass of the polymer was added thereto. With respect to the hydrogenation rate of the obtained hydrogenated block copolymer (Polymer 1), the hydrogenation rate of butadiene was 99%, and that of isoprene was 5%.

<Polymer 2: A Hydrogenated Product of Isoprene-Styrene-Butadiene-Styrene-Isoprene>

A polymer was fabricated as in Polymer 1. A cyclohexane solution containing 1.5 parts by weight of isoprene was charged, and thereafter, 0.05 part by weight of n-butyllithium based on 100 parts by weight of the whole monomers and 0.55 mol of TMEDA based on 1 mol of n-butyllithium were added thereto, and polymerized at 70° C. for 30 min. Thereafter, a cyclohexane solution containing 15 parts by weight of styrene was added thereto, and polymerized at 70° C. for 30 min. Then, a cyclohexane solution containing 67 parts by weight of butadiene was added thereto, and polymerized at 70° C. for 1 hour. Then, a cyclohexane solution containing 15 parts by weight of styrene was added thereto, and polymerized at 70° C. for 30 min. Finally, a cyclohexane solution containing 1.5 parts by weight of isoprene was charged thereto, and polymerized at 70° C. for 30 min. The obtained polymer had a styrene content of 30% by weight, a polystyrene block content of 29.5% by weight, an isoprene content of 3% by weight, a vinyl bond amount of a polybutadiene block part of 37% by weight, a molecular weight of the entire polymer of 318,000, a molecular weight of the polystyrene block of 32,000, and a molecular weight distribution of 1.04.

Next, the obtained polymer was subjected to hydrogenation reaction as in Polymer 1 to obtain a hydrogenated block copolymer (Polymer 2). With respect to the hydrogenation rate of the obtained hydrogenated block copolymer (Polymer 2), the hydrogenation rate of butadiene was 98%, and that of isoprene was 4%.

<Polymer 3: A Hydrogenated Product of Styrene-Isoprene-Butadiene-Isoprene-Styrene>

A polymer was fabricated as in Polymer 1. A cyclohexane solution containing 15 parts by weight of styrene was charged, and thereafter, 0.05 part by weight of n-butyllithium based on 100 parts by weight of the whole monomers and 0.55 mol of TMEDA based on 1 mol of n-butyllithium were added thereto, and polymerized at 70° C. for 30 min. Thereafter, a cyclohexane solution containing 1.5 parts by weight of isoprene was added thereto, and polymerized at 70° C. for 30 min. Then, a cyclohexane solution containing 67 parts by weight of butadiene was added thereto, and polymerized at 70° C. for 1 hour. Then, a cyclohexane solution containing 1.5 parts by weight of isoprene was added thereto, and polymerized at 70° C. for 30 min. Finally, a cyclohexane solution containing 15 parts by weight of styrene was charged thereto, and polymerized at 70° C. for 30 min. The obtained polymer had a styrene content of 30% by weight, a polystyrene block content of 29.4% by weight, an isoprene content of 3% by weight, a vinyl bond amount of a polybutadiene block part of 35% by weight, a molecular weight of the entire polymer of 315,000, a molecular weight of the polystyrene block of 31,000, and a molecular weight distribution of 1.03.

Next, the obtained polymer was subjected to hydrogenation reaction as in Polymer 1 to obtain a hydrogenated block copolymer (Polymer 3). With respect to the hydrogenation rate of the obtained hydrogenated block copolymer (Polymer 3), the hydrogenation rate of butadiene was 98%, and that of isoprene was 4%.

<Polymer 4: A Hydrogenated Product of Isoprene-Styrene-Butadiene-Styrene-Isoprene>

A polymer was fabricated as in Polymer 1. A cyclohexane solution containing 1.5 parts by weight of isoprene was charged, and thereafter, 0.05 part by weight of n-butyllithium based on 100 parts by weight of the whole monomers and 0.55 mol of TMEDA based on 1 mol of n-butyllithium were added thereto, and polymerized at 70° C. for 30 min. Thereafter, a cyclohexane solution containing 15 parts by weight of styrene was added thereto, and polymerized at 70° C. for 30 min. Then, a cyclohexane solution containing 67 parts by weight of butadiene was added thereto, and polymerized at 70° C. for 1 hour. Then, a cyclohexane solution containing 15 parts by weight of styrene was added thereto, and polymerized at 70° C. for 30 min. Finally, a cyclohexane solution containing 1.5 parts by weight of isoprene was charged thereto, and polymerized at 70° C. for 30 min. The obtained polymer had a styrene content of 30% by weight, a polystyrene block content of 29% by weight, an isoprene content of 3% by weight, a vinyl bond amount of a polybutadiene block part of 36% by weight, a molecular weight of the entire polymer of 298,000, a molecular weight of the polystyrene block of 31,000, and a molecular weight distribution of 1.05.

Next, the obtained polymer was subjected to hydrogenation reaction as in Polymer 1 to obtain a hydrogenated block copolymer (Polymer 4). With respect to the hydrogenation rate of the obtained hydrogenated block copolymer (Polymer 4), the hydrogenation rate of butadiene was 99.5%, and that of isoprene was 34%.

<Polymer 5: A Hydrogenated Product of Isoprene-Styrene-Butadiene-Isoprene-Butadiene-Styrene-Isoprene>

A polymer was fabricated as in Polymer 1. A cyclohexane solution containing 1.5 parts by weight of isoprene was charged, and thereafter, 0.05 part by weight of n-butyllithium based on 100 parts by weight of the whole monomers and 0.55 mol of TMEDA based on 1 mol of n-butyllithium were added thereto, and polymerized at 70° C. for 30 min. Thereafter, a cyclohexane solution containing 14 parts by weight of styrene was added thereto, and polymerized at 70° C. for 30 min. Then, a cyclohexane solution containing 34 parts by weight of butadiene was added thereto, and polymerized at 70° C. for 30 min. Then, a cyclohexane solution containing 1.5 parts by weight of isoprene was added thereto, and polymerized at 70° C. for 30 min. Then, a cyclohexane solution containing 33.5 parts by weight of butadiene was added thereto, and polymerized at 70° C. for 30 min. Then, a cyclohexane solution containing 14 parts by weight of styrene was added thereto, and polymerized at 70° C. for 30 min. Finally, a cyclohexane solution containing 1.5 parts by weight of isoprene was charged thereto, and polymerized at 70° C. for 30 min. The obtained polymer had a styrene content of 28% by weight, a polystyrene block content of 27.8% by weight, an isoprene content of 4.5% by weight, a vinyl bond amount of a polybutadiene block part of 34% by weight, a molecular weight of the entire polymer of 321,000, a molecular weight of the polystyrene block of 31,000, and a molecular weight distribution of 1.05.

Next, the obtained polymer was subjected to hydrogenation reaction as in Polymer 1 to obtain a hydrogenated block copolymer (Polymer 5). With respect to the hydrogenation rate of the obtained hydrogenated block copolymer (Polymer 5), the hydrogenation rate of butadiene was 96%, and that of isoprene was 4%.

<Polymer 6: A Hydrogenated Product of Isoprene/Styrene-Butadiene-Styrene/Isoprene>

A polymer was fabricated as in Polymer 1. A cyclohexane solution containing 2 parts by weight of isoprene and 29 parts by weight of styrene was charged, and thereafter, 0.145 part by weight of n-butyllithium based on 100 parts by weight of the whole monomers and 0.35 mol of TMEDA based on 1 mol of n-butyllithium were added thereto, and polymerized at 70° C. for 30 min.

Thereafter, a cyclohexane solution containing 69 parts by weight of butadiene was added thereto, and polymerized at 70° C. for 1 hour. Then, a living polymer of the obtained copolymer was reacted with 0.5 mol of ethyl benzoate as a coupling agent based on n-butyllithium used for the polymerization. The obtained polymer had a styrene content of 29% by weight, a polystyrene block content of 26% by weight, an isoprene content of 2% by weight, a vinyl bond amount of a polybutadiene block part of 40% by weight, a molecular weight of the entire polymer of 155,000, a molecular weight of the polystyrene block of 14,000, and a molecular weight distribution of 1.10.

Next, the obtained polymer was subjected to hydrogenation reaction as in Polymer 1 to obtain a hydrogenated block copolymer (Polymer 6). With respect to the hydrogenation rate of the obtained hydrogenated block copolymer (Polymer 6), the hydrogenation rate of butadiene was 98%, and that of isoprene was 6%.

<Polymer 7: A Hydrogenated Product of Styrene-Butadiene-Styrene>

A polymer was fabricated as in Polymer 1. A cyclohexane solution containing 15 parts by weight of styrene was charged, and thereafter, 0.05 part by weight of n-butyllithium based on 100 parts by weight of the whole monomers and 0.55 mol of TMEDA based on 1 mol of n-butyllithium were added thereto, and polymerized at 70° C. for 30 min. Thereafter, a cyclohexane solution containing 70 parts by weight of butadiene was added thereto, and polymerized at 70° C. for 1 hour. Finally, a cyclohexane solution containing 15 parts by weight of styrene was added thereto, and polymerized at 70° C. for 30 min. The obtained polymer had a styrene content of 30% by weight, a polystyrene block content of 29% by weight, a vinyl bond amount of a polybutadiene block part of 38% by weight, a molecular weight of the entire polymer of 321,000, a molecular weight of the polystyrene block of 32,000, and a molecular weight distribution of 1.03.

Next, the obtained polymer was subjected to hydrogenation reaction as in Polymer 1 to obtain a hydrogenated block copolymer (Polymer 7). With respect to the hydrogenation rate of the obtained hydrogenated block copolymer (Polymer 7), the hydrogenation rate of butadiene was 99%.

<Polymer 8: A Partially Hydrogenated Product of Styrene-Butadiene-Styrene>

The non-hydrogenated polymer of (Polymer 7) was subjected to hydrogenation reaction as in Polymer 1 to obtain a partially hydrogenated block copolymer (Polymer 8), whose hydrogenation reaction had been stopped on the way. With respect to the hydrogenation rate of the obtained partially hydrogenated block copolymer (Polymer 8), the hydrogenation rate of butadiene was 55%.

<Polymer 9: A Hydrogenated Product of Isoprene-Styrene-Butadiene-Styrene/Butadiene-Styrene-Isoprene>

A polymer was fabricated as in Polymer 1. A cyclohexane solution containing 2 parts by weight of isoprene was charged, and thereafter, 0.068 part by weight of n-butyllithium based on 100 parts by weight of the whole monomers and 0.7 mol of TMEDA based on 1 mol of n-butyllithium were added thereto, and polymerized at 70° C. for 30 min. Thereafter, a cyclohexane solution containing 14 parts by weight of styrene was added thereto, and polymerized at 70° C. for 30 min. Then, a cyclohexane solution containing 18 parts by weight of butadiene was added thereto, and polymerized at 70° C. for 30 min. Then, a cyclohexane solution containing 15 parts by weight of butadiene and 35 parts by weight of styrene was added thereto, and polymerized at 70° C. for 1 hour. Then, a cyclohexane solution containing 14 parts by weight of styrene was added thereto, and polymerized at 70° C. for 30 min. Finally, a cyclohexane solution containing 2 parts by weight of isoprene was charged thereto, and polymerized at 70° C. for 30 min. The obtained polymer had a styrene content of 63% by weight, a polystyrene block content of 28% by weight, an isoprene content of 4% by weight, a vinyl bond amount of a polybutadiene homoblock part of 48% by weight, a vinyl bond amount of a polybutadiene random block part of 13% by weight, a molecular weight of the entire polymer of 167,000, and a molecular weight distribution of 1.10.

Next, the obtained polymer was subjected to hydrogenation reaction as in Polymer 1 to obtain a hydrogenated block copolymer (Polymer 9). With respect to the hydrogenation rate of the obtained hydrogenated block copolymer (Polymer 9), the hydrogenation rate of butadiene was 99%, and that of isoprene was 5%.

<Polymer 10: A Hydrogenated Product of Isoprene-Styrene-Butadiene-Styrene/Butadiene-Styrene-Isoprene>

A polymer was fabricated as in Polymer 1. A cyclohexane solution containing 2 parts by weight of isoprene was charged, and thereafter, 0.068 part by weight of n-butyllithium based on 100 parts by weight of the whole monomers and 0.7 mol of TMEDA based on 1 mol of n-butyllithium were added thereto, and polymerized at 70° C. for 30 min. Thereafter, a cyclohexane solution containing 14 parts by weight of styrene was added thereto, and polymerized at 70° C. for 30 min. Then, a cyclohexane solution containing 18 parts by weight of butadiene was added thereto, and polymerized at 70° C. for 30 min. Then, a cyclohexane solution containing 15 parts by weight of butadiene and 35 parts by weight of styrene was added thereto, and polymerized at 70° C. for 1 hour. Then, a cyclohexane solution containing 14 parts by weight of styrene was added thereto, and polymerized at 70° C. for 30 min. Finally, a cyclohexane solution containing 2 parts by weight of isoprene was charged thereto, and polymerized at 70° C. for 30 min. The obtained polymer had a styrene content of 63% by weight, a polystyrene block content of 29% by weight, an isoprene content of 4% by weight, a vinyl bond amount of a polybutadiene homoblock part of 49% by weight, a vinyl bond amount of a polybutadiene random block part of 19% by weight, a molecular weight of the entire polymer of 154,000, and a molecular weight distribution of 1.11.

Next, the obtained polymer was subjected to hydrogenation reaction as in Polymer 1 to obtain a hydrogenated block copolymer (Polymer 10). With respect to the hydrogenation rate of the obtained hydrogenated block copolymer (Polymer 10), the hydrogenation rate of butadiene was 99.5%, and that of isoprene was 37%.

<Polymer 11: A Hydrogenated Product of Styrene-Butadiene-Styrene/Butadiene-Styrene>

A polymer was fabricated as in Polymer 1. A cyclohexane solution containing 15 parts by weight of styrene was charged, and thereafter, 0.068 part by weight of n-butyllithium based on 100 parts by weight of the whole monomers and 0.7 mol of TMEDA based on 1 mol of n-butyllithium were added thereto, and polymerized at 70° C. for 30 min. Thereafter, a cyclohexane solution containing 20 parts by weight of butadiene was added thereto, and polymerized at 70° C. for 30 min. Then, a cyclohexane solution containing 15 parts by weight of butadiene and 35 parts by weight of styrene was added thereto, and polymerized at 70° C. for 1 hour.

Finally, a cyclohexane solution containing 15 parts by weight of styrene was charged thereto, and polymerized at 70° C. for 30 min. The obtained polymer had a styrene content of 65% by weight, a polystyrene block content of 30% by weight, a vinyl bond amount of a polybutadiene homoblock part of 50% by weight, a vinyl bond amount of a polybutadiene random block part of 12% by weight, a molecular weight of the entire polymer of 165,000, and a molecular weight distribution of 1.11.

Next, the obtained polymer was subjected to hydrogenation reaction as in Polymer 1 to obtain a hydrogenated block copolymer (Polymer 11). With respect to the hydrogenation rate of the obtained hydrogenated block copolymer (Polymer 11), the hydrogenation rate of butadiene was 98%.

<Polymer 12: A Partially Hydrogenated Product of Styrene-Butadiene-Styrene/Butadiene-Styrene>

The non-hydrogenated polymer of (Polymer 11) was subjected to hydrogenation reaction as in Polymer 1 to obtain a partially hydrogenated block copolymer (Polymer 12), whose hydrogenation reaction had been stopped on the way. With respect to the hydrogenation rate of the obtained partially hydrogenated block copolymer (Polymer 12), the hydrogenation rate of butadiene was 53%.

<Polymer 13: A Hydrogenated Product of Isoprene-Styrene-Butadiene-Styrene-Isoprene>

A polymer was fabricated as in Polymer 1. A cyclohexane solution containing 2 parts by weight of isoprene was charged, and thereafter, 0.05 part by weight of n-butyllithium based on 100 parts by weight of the whole monomers and 0.55 mol of TMEDA based on 1 mol of n-butyllithium were added thereto, and polymerized at 70° C. for 30 min. Thereafter, a cyclohexane solution containing 7 parts by weight of styrene was added thereto, and polymerized at 70° C. for 30 min. Then, a cyclohexane solution containing 82 parts by weight of butadiene was added thereto, and polymerized at 70° C. for 1 hour. Then, a cyclohexane solution containing 7 parts by weight of styrene was added thereto, and polymerized at 70° C. for 30 min. Finally, a cyclohexane solution containing 2 parts by weight of isoprene was charged thereto, and polymerized at 70° C. for 30 min. The obtained polymer had a styrene content of 14% by weight, a polystyrene block content of 14% by weight, an isoprene content of 4% by weight, a vinyl bond amount of a polybutadiene block part of 36% by weight, a molecular weight of the entire polymer of 341,000, a molecular weight of the polystyrene block of 15,000, and a molecular weight distribution of 1.05.

Next, the obtained polymer was subjected to hydrogenation reaction as in Polymer 1 to obtain a hydrogenated block copolymer (Polymer 13). With respect to the hydrogenation rate of the obtained hydrogenated block copolymer (Polymer 13), the hydrogenation rate of butadiene was 98%, and that of isoprene was 6%.

<Polymer A: Epoxidization of Polymer 2>

Epoxidization reaction was carried out using a reactor tank of 5 L in internal volume with a stirring apparatus and a jacket, whose interior was washed, dried and replaced by nitrogen. First, a cyclohexane solution containing 500 g of the hydrogenated block copolymer (Polymer 2) (concentration: 20% by weight) was charged. Thereafter, 0.4 mol of formic acid was added thereto, and stirred at 60° C. for 30 min. Then, 0.4 mol of hydrogen peroxide was added thereto in 10 min, and the mixture was reacted at 60° C. for 4 hours. As a result of determination by titration of the epoxy content of the obtained polymer, the polymer had 8 epoxy groups added in one molecule.

Next, the obtained polymer was washed three times with water; the reaction solution was charged into a hot water under stirring; and the solvent was removed and recovered by steam stripping to obtain a pelletized, epoxidized hydrogenated block copolymer (Polymer A).

<Polymer B: Epoxidization of Polymer 8>

(Polymer 8) was subjected epoxidization reaction by the same method as in Polymer A to obtain an epoxidized hydrogenated block copolymer. The epoxy content of the obtained epoxidized hydrogenated block copolymer was determined. The epoxidized hydrogenated block copolymer (Polymer B) was obtained in which 15 epoxy groups were added to one molecule of the hydrogenated block copolymer of (Polymer 8).

<Polymer C: Epoxidization of Polymer 9>

Epoxidization reaction was carried out using a reactor tank of 5 L in internal volume with a stirring apparatus and a jacket, whose interior was washed, dried and replaced by nitrogen. First, a cyclohexane solution containing 500 g of the hydrogenated block copolymer (Polymer 9) (concentration: 20% by weight) was charged. Thereafter, 0.4 mol of formic acid was added thereto, and stirred at 60° C. for 30 min. Then, 0.4 mol of hydrogen peroxide was added thereto in 10 min, and the mixture was reacted at 60° C. for 4 hours. As a result of determination by titration of the epoxy content of the obtained polymer, the polymer had 9 epoxy groups added in one molecule.

Next, the obtained polymer was washed three times with water; the reaction solution was charged into a hot water under stirring; and the solvent was removed and recovered by steam stripping to obtain a pelletized, epoxidized hydrogenated block copolymer (Polymer C).

<Polymer D: Epoxidization of Polymer 12>

(Polymer 12) was subjected epoxidization reaction by the same method as in Polymer A to obtain an epoxidized hydrogenated block copolymer. The epoxy content of the obtained epoxidized hydrogenated block copolymer was determined. The epoxidized hydrogenated block copolymer (Polymer D) was obtained in which 15 epoxy groups were added to one molecule of the hydrogenated block copolymer of (Polymer D).

<Component (G)>

Thermoplastic resin-1: a polypropylene resin, PL500A (made by SunAllomer Ltd.), MRF (230° C., 2.16 kg): 3.3 g/min Thermoplastic resin-2: a polypropylene resin, PL630A (made by SunAllomer Ltd.), MRF (230° C., 2.16 kg): 7.5 g/min <Component (H)>

Rubber softener: a paraffin oil, PW-380 (made by Idemitsu Kosan Co., Ltd.)

<Component (J)>

Crosslinking agent-1: a polymethylol phenol resin, Tackirol 250-1 (made by Taoka Chemical Co., Ltd.)

Crosslinking agent-2: a polyfunctional compound, tricarboxylic acid TCX-21 (made by Asahi Kasei Corp.)

<Component (K)>

Silicone oil: SH200, 5,000 cs (made by Dow Corning Toray Co., Ltd.)

Example 1

(Polymer 1), the polypropylene resin (PL500A), the paraffin oil (PW-380), the phenol resin (Tackirol 250-1) as crosslinking agent-1 and zinc oxide were pre-mixed in the proportion shown in Table described later; thereafter, the mixture was supplied to a Laboplastomill (made by Toyo Seiki Seisaku-sho, Ltd.), and melted and kneaded at a cylinder temperature of 200° C. and at a screw rotation frequency of 100 rpm to manufacture a thermoplastic elastomer composition. The obtained composition was compression molded at 200° C. to fabricate sheets of 2 mm in thickness to obtain specimens for physical properties. Physical properties of the specimens were measured and the results are shown in Table. The composition having an excellent balance of strength, elongation and compression set was obtained.

Example 2

A composition was obtained using (Polymer 2) as in Example 1; molded sheets were fabricated; and physical properties were measured. The results are shown in Table. The composition having an excellent balance of strength, elongation and compression set was obtained.

Example 3

A composition was obtained using (Polymer 3) as in Example 1; molded sheets were fabricated; and physical properties were measured. The results are shown in Table. The composition having an excellent balance of strength, elongation and compression set was obtained.

Example 4

A composition was obtained using (Polymer 4) as in Example 1; molded sheets were fabricated; and physical properties were measured. The results are shown in Table. The composition having an excellent balance of strength, elongation and compression set was obtained.

Example 5

A composition was obtained using (Polymer 5) as in Example 1; molded sheets were fabricated; and physical properties were measured. The results are shown in Table.
The composition having an excellent balance of strength, elongation and compression set was obtained.

Comparative Example 1

A composition was obtained using (Polymer 6) as in Example 1; molded sheets were fabricated; and physical properties were measured. The results are shown in Table. The results exhibited an inferior compression set.

Comparative Example 2

A composition was obtained using (Polymer 7) as in Example 1; molded sheets were fabricated; and physical properties were measured. The results are shown in Table. The results exhibited an inferior compression set.

Example 6

(Polymer A), the polypropylene resin (PL500A), the paraffin oil (PW-380) and tricarboxylic acid (TCX-21) as crosslinking agent-2 were pre-mixed in the proportion shown in Table 2 described later; thereafter, the mixture was supplied to a Laboplastomill (made by Toyo Seiki Seisaku-sho, Ltd.), and melted and kneaded at a cylinder temperature of 200° C. and at a screw rotation frequency of 100 rpm to manufacture a thermoplastic elastomer composition. The obtained composition was compression molded at 200° C. to fabricate sheets of 2 mm in thickness to obtain specimens for physical properties. Physical properties of the specimens were measured and the results are shown in Table. The composition having an excellent balance of strength, elongation and compression set was obtained.

Comparative Example 3

A composition was obtained using (Polymer B) as in Example 6; molded sheets were fabricated; and physical properties were measured. The results are shown in Table. The results exhibited a low elongation ratio.

Example 7

(Polymer 9), the polypropylene resin (PC630A), the paraffin oil (PW-380), the phenol resin (Tackirol 250-1) as crosslinking agent-1 or tricarboxylic acid (TCX-21) as crosslinking agent-2, the silicone oil (SH200), and zinc oxide were pre-mixed in the proportion shown in Table 2 described later; thereafter, the mixture was supplied to a Laboplastomill (made by Toyo Seiki Seisaku-sho, Ltd.), and melted and kneaded at a cylinder temperature of 200° C. and at a screw rotation frequency of 100 rpm to manufacture a thermoplastic elastomer composition. The obtained composition was compression molded at 200° C. to fabricate sheets of 2 mm in thickness to obtain specimens for physical properties. Physical properties of the specimens were measured and the results are shown in Table 2. The composition having a low impact resilience and an excellent balance of abrasion resistance, strength, elongation and compression set was obtained.

Example 8

A composition was obtained using (Polymer 10) as in Example 7; molded sheets were fabricated; and physical properties were measured. The results are shown in Table 2. The composition having a low impact resilience and an excellent balance of abrasion resistance, strength, elongation and compression set was obtained.

Example 9

A composition was obtained using (Polymer C) as in Example 7; molded sheets were fabricated; and physical properties were measured. The results are shown in Table 2. The composition having a low impact resilience and an excellent balance of abrasion resistance, strength, elongation and compression set was obtained.

Example 10

A composition was obtained using (Polymer 5) as in Example 7; molded sheets were fabricated; and physical properties were measured. The results are shown in Table 2. The composition having a low impact resilience and an excellent balance of abrasion resistance, strength, elongation and compression set was obtained.

Comparative Example 4

A composition was obtained using (Polymer 11) as in Example 7; molded sheets were fabricated; and physical properties were measured. The results are shown in Table 2. The results exhibited an inferior compression set.

Comparative Example 5

A composition was obtained using (Polymer 12) as in Example 7; molded sheets were fabricated; and physical properties were measured. The results are shown in Table 2. The results exhibited an inferior elongation and compression set.

Comparative Example 6

A composition was obtained using (Polymer 13) as in Example 7; molded sheets were fabricated; and physical properties were measured. The results are shown in Table 2. The results exhibited a high impact resilience and an inferior abrasion resistance and strength.

Comparative Example 7

A composition was obtained using (Polymer D) as in Example 7; molded sheets were fabricated; and physical properties were measured. The results are shown in Table 2. The results exhibited an inferior elongation and compression set.

Example 11

A composition was obtained using (Polymer 2) and (Polymer 9) as in Example 7; molded sheets were fabricated; and physical properties were measured. The results are shown in Table 3. The composition having a low impact resilience and an excellent balance of abrasion resistance, strength, elongation and compression set was obtained.

Example 12

A composition was obtained using (Polymer 7) and (Polymer 9) as in Example 7; molded sheets were fabricated; and physical properties were measured. The results are shown in Table 3. The composition having a low impact resilience and an excellent balance of abrasion resistance, strength, elongation and compression set was obtained.

Example 13

A composition was obtained using (Polymer A) and (Polymer C) as in Example 7; molded sheets were fabricated; and physical properties were measured. The results are shown in Table 3. The composition having a low impact resilience and an excellent balance of abrasion resistance, strength, elongation and compression set was obtained.

Comparative Example 8

A composition was obtained using (Polymer 7) and (Polymer 11) as in Example 7; molded sheets were fabricated; and physical properties were measured. The results are shown in Table 3. The results exhibited an inferior compression set.

Comparative Example 9

A composition was obtained using (Polymer 7) and (Polymer 12) as in Example 7; molded sheets were fabricated; and physical properties were measured. The results are shown in Table 3. The results exhibited an inferior elongation and compression set.

Comparative Example 10

A composition was obtained using (Polymer D) and (Polymer 7) as in Example 7; molded sheets were fabricated; and physical properties were measured. The results are shown in Table 3. The results exhibited an inferior elongation and compression set.

TABLE 1 unit: parts by weight

| | Example 1 | Example 2 | Example 3 | Example 4 | Example 5 | Comparative Example 1 | Comparative Example 2 | Example 6 | Comparative Example 3 |
|---|---|---|---|---|---|---|---|---|---|
| "formulation" | | | | | | | | | |
| Polymer 1 | 100 | | | | | | | | |
| Polymer 2 | | 100 | | | | | | | |
| Polymer 3 | | | 100 | | | | | | |
| Polymer 4 | | | | 100 | | | | | |
| Polymer 5 | | | | | 100 | | | | |
| Polymer 6 | | | | | | 100 | | | |
| Polymer 7 | | | | | | | 100 | | |
| Polymer A | | | | | | | | 100 | |
| Polymer B | | | | | | | | | 100 |
| polypropylene | 30 | 30 | 30 | 30 | 30 | 30 | 30 | 30 | 30 |
| paraffin oil | 90 | 100 | 100 | 100 | 100 | 100 | 100 | 100 | 100 |
| crosslinking agent-1 | 13 | 13 | 13 | 13 | 13 | 13 | 13 | | |
| zinc oxide | 2 | 2 | 2 | 2 | 2 | 2 | 2 | | |
| crosslinking agent-2 | | | | | | | | 2 | 2 |
| "physical properties" | | | | | | | | | |
| hardness (JIS A) | 67 | 67 | 68 | 66 | 67 | 63 | 69 | 66 | 68 |
| tensile strength (MPa) | 140 | 155 | 158 | 132 | 111 | 100 | 130 | 150 | 80 |
| elongation at break (%) | 800 | 830 | 830 | 840 | 650 | 900 | 820 | 840 | 240 |
| 100° C. compression set (%) | 34 | 28 | 27 | 33 | 26 | 55 | 62 | 29 | 35 |
| 120° C. compression set (%) | 36 | 30 | 28 | 35 | 27 | 59 | 76 | 31 | 45 |

TABLE 2 unit: parts by weight

| | Example 7 | Example 8 | Example 9 | Example 10 | Comparative Example 4 | Comparative Example 5 | Comparative Example 6 | Comparative Example 7 |
|---|---|---|---|---|---|---|---|---|
| "formulation" | | | | | | | | |
| polymer 5 | | | | 100 | | | | |
| polymer 9 | 100 | | | | | | | |
| polymer 10 | | 100 | | | | | | |
| polymer 11 | | | | | 100 | | | |
| polymer 12 | | | | | | 100 | | |
| polymer 13 | | | | | | | 100 | |
| polymer C | | | 100 | | | | | |
| polymer D | | | | | | | | 100 |
| polypropylene | 40 | 40 | 40 | 40 | 40 | 40 | 40 | 40 |
| paraffin oil | 40 | 40 | 40 | 40 | 40 | 40 | 40 | 40 |
| silicone oil | 2 | 2 | 2 | 2 | 2 | 2 | 2 | 2 |
| crosslinking agent-1 | 13 | 13 | | 13 | 13 | 13 | 1 | |
| zinc oxide | 2 | 2 | | 2 | 2 | 2 | 2 | |
| crosslinking agent-2 | | | 2 | | | | | 2 |
| "physical properties" | | | | | | | | |
| hardness (JIS A) | 85 | 83 | 84 | 75 | 82 | 86 | 70 | 85 |
| tensile strength (MPa) | 201 | 195 | 198 | 175 | 188 | 150 | 72 | 160 |
| elongation at break (%) | 595 | 605 | 600 | 670 | 510 | 200 | 850 | 220 |
| impact resilience (%) | 12 | 11 | 11 | 52 | 11 | 13 | 58 | 12 |
| 70° C. compression set (%) | 53 | 56 | 54 | 39 | 77 | 69 | 59 | 71 |
| 100° C. compression set (%) | 54 | 58 | 56 | 41 | 100 | 90 | 62 | 92 |
| texture depth remaining rate | ◉ (excellent) | ◉ (excellent) | ◉ (excellent) | Δ (fair) | ◉ (excellent) | ○ (good) | X (bad) | ○ (good) |
| surface state after abrasion | ○ (good) | ○ (good) | ○ (good) | Δ (fair) | ○ (good) | ○ (good) | X (bad) | ○ (good) |
| surface touch feeling | ○ (good) | ○ (good) | ○ (good) | ○ (good) | ○ (good) | ○ (good) | X (bad) | ○ (good) |

TABLE 3 unit: parts by weight

| | Example 11 | Example 12 | Example 13 | Comparative Example 8 | Comparative Example 9 | Comparative Example 10 |
|---|---|---|---|---|---|---|
| "formulation" | | | | | | |
| polymer 9 | 50 | 50 | | | | |
| polymer 11- | | | | 50 | | |
| polymer 12 | | | | | 50 | |
| polymer 7 | | 50 | | 50 | 50 | 50 |
| polymer 2 | 50 | | | | | |
| polymer A | | | 50 | | | |
| polymer C | | | 50 | | | |
| polymer D | | | | | | 50 |
| polypropylene | 40 | 40 | | | | |
| paraffin oil | 40 | 40 | | | | |
| silicone oil | 2 | 2 | 2 | 2 | 2 | 2 |
| crosslinking agent-1 | 13 | 13 | | 13 | 13 | |
| zinc oxide | 2 | 2 | | 2 | 2 | |
| crosslinking agent-2 | | | 2 | | | 2 |
| "physical properties" | | | | | | |
| hardness (JIS A) | 83 | 84 | 82 | 81 | 82 | 81 |
| tensile strength (MPa) | 240 | 255 | 230 | 260 | 210 | 220 |
| elongation at break (%) | 725 | 730 | 710 | 690 | 350 | 360 |
| impact resilience (%) | 15 | 14 | 15 | 15 | 17 | 16 |
| 70° C. compression set (%) | 48 | 54 | 50 | 62 | 58 | 59 |
| 100° C. compression set (%) | 49 | 56 | 51 | 86 | 78 | 79 |
| texture depth remaining rate | ◉ (excellent) | ◉ (excellent) | ◉ (excellent) | ◉ (excellent) | ○ (good) | ○ (good) |
| surface state after abrasion | ○ (good) | ○ (good) | ○ (good) | ○ (good) | ○ (good) | ○ (good) |
| surface touch feeling | ○ (good) | ○ (good) | ○ (good) | ○ (good) | ○ (good) | ○ (good) |

TABLE 4

| polymer | structure |
|---|---|
| 1 | St-Ip-Bd-Ip-St (low molecular weight) |
| 2 | Ip-St-Bd-St-Ip (Ip: 1.5 wt %) Ip hydrogenation rate 4% |
| 3 | St-Ip-Bd-Ip-St (high molecular weight) |
| 4 | Ip-St-Bd-St-Ip (Ip: 1.5 wt %) Ip hydrogenation rate 34% |

TABLE 4-continued

| polymer | structure |
|---|---|
| 5 | Ip-St-Bd-Ip-Bd-St-Ip |
| 6 | Ip/St-Bd-St/Ip |
| 7 | St-Bd-St complete hydrogenation |
| 8 | St-Bd-St Partial hydrogenation |
| 9 | Ip-St-Bd-St/Bd-St-Ip Ip hydrogenation rate 5% |
| 10 | Ip-St-Bd-St/Bd-St-Ip Ip hydrogenation rate 37% |
| 11 | St-Bd-St/Bd-St complete hydrogenation |
| 12 | St-Bd-St/Bd-St partial hydrogenation |
| 13 | Ip-St-Bd-St-Ip (Ip: 2.0 wt %) |
| A | epoxidization of 2 |
| B | epoxidization of 8 |
| C | epoxidization of 9 |
| D | epoxidization of 12 |

INDUSTRIAL APPLICABILITY

The hydrogenated block copolymer, the adhesive composition and the dynamic crosslinking composition of the present invention can suitably be used for various types of molded products including autoparts, civil engineering and building applications, household appliance parts, sporting goods, sundry articles and stationery, and in other wide fields.

The invention claimed is:

1. A hydrogenated straight-chain block copolymer, obtained by selective hydrogenation of a straight-chain block copolymer comprising:
   i. at least two polymer blocks A, on both terminals thereof, which each comprise a vinyl aromatic monomer unit as a main component and which may be the same or different from each other;
   ii. at least two polymer blocks B, internally in relation to the polymer blocks A, which each comprise a conjugated diene monomer unit having 5 or more carbon atoms as a main component and which may be the same or different from each other; and
   iii. one or more polymer blocks selected from
      a. one or more polymer blocks C which each comprise a conjugated diene monomer unit having 4 or more carbon atoms as a main component and which may be the same or different from each other,
      b. one or more random copolymer blocks D which each comprise a conjugated diene monomer unit having 4 or more carbon atoms (d-1) and a vinyl aromatic monomer unit (d-2) as main components and which may be the same or different, and
      c. a combination of the polymer blocks C and D,
   wherein:
      a. the polymer block A has a weight-average molecular weight M of 21,000 or more;
      b. the polymer block B has a hydrogenation rate of 50% or less for olefinic unsaturated double bonds;
      c. the polymer blocks C and D have a hydrogenation rate of 80% or more for olefinic unsaturated double bonds;
      d. the block copolymer comprises 10% by weight to 85% by weight of the vinyl aromatic monomer unit;
      e. the block copolymer has contents of 10% by weight to 70% by weight of A, 1% by weight to 15% by weight of B, 0% by weight to 85% by weight of C, 0% by weight to 85% by weight of D and 25% by weight to 85% by weight of C+D, based on 100% by weight of the total of A+B+C+D; and
      f. the A, B, C, and D are arranged linearly.

2. The hydrogenated block copolymer according to claim 1, obtained by hydrogenation of a block copolymer comprising 2% by weight to 80% by weight of the random copolymer block D.

3. The hydrogenated block copolymer according to claim 1, obtained by hydrogenation of a block copolymer comprising 2% by weight to 80% by weight of the polymer block C.

4. The hydrogenated block copolymer according to claim 1, wherein the random copolymer D has a ratio of 30% by weight or more for the vinyl aromatic monomer unit (d-2) with respect to 100% by weight of the random copolymer D.

5. The hydrogenated block copolymer according to claim 1, wherein the polymer block C has a vinyl bond amount of 15% to 80% in the whole conjugated diene.

6. The hydrogenated block copolymer according to claim 1, wherein the polymer block D has a vinyl bond amount of 10% to 50% in the whole conjugated diene.

7. The hydrogenated block copolymer according to claim 1, wherein the conjugated diene of the polymer block B is isoprene.

8. The hydrogenated block copolymer according to claim 1, wherein the conjugated dienes of the polymer block C and the polymer block D are 1,3-butadiene.

9. The hydrogenated block copolymer according to claim 1,
   wherein the conjugated diene of the polymer block B is isoprene; and the conjugated dienes of the polymer block C and the polymer block D are 1,3-butadiene, and
   wherein the block copolymer is hydrogenated using a compound comprising a titanocene compound as a hydrogenation catalyst; 90% or more of 1,3-butadiene of the polymer block C and the polymer block D is hydrogenated; and 90% or more of 1,4-bonds in isoprene of the polymer block B is not hydrogenated, and the hydrogenation rate of 3,4-bonds therein is 50% or less.

10. The hydrogenated block copolymer according to claim 1, obtained by hydrogenation of the block copolymer comprising three or more polymer blocks B and at least one polymer block B as an internal block.

11. The hydrogenated block copolymer according to claim 1, wherein the terminal block parts of the hydrogenated block copolymer comprise the polymer block A; and the hydrogenated block copolymer is a straight-chain block copolymer represented by the general formula shown below:

$$H\text{—}(S\text{—}H)_n,$$

or a straight-chain block copolymer represented by the general formula shown below:

$$[(H\text{—}S)_k]_m\text{—}X, [H\text{—}(S\text{—}H)_k]_m\text{—}X,$$

wherein H denotes a block copolymer of A-B or B-A, or a random copolymer of A/B, and H's may be the same or different; S denotes a homoblock of C or a homoblock of D, or a block copolymer of C-D or D-C, and may contain 10% by weight or less of the B block, and S's may be the same or different; n and k are each an integer of 1 to 5, and m is an integer of 2 to 6; X denotes a residue of a coupling agent or a residue of a polyfunctional initiator; and when the polymer blocks A to D are each present in a plural number in the copolymer, the respective structures such as molecular weights and compositions may be each the same or different.

12. The hydrogenated block copolymer according to claim 1, having a weight-average molecular weight of 30,000 to 2,000,000 in terms of polystyrene.

13. The functionalized hydrogenated block copolymer according to claim 1, wherein the polymer block B containing residual olefinic unsaturated double bonds comprises a functional group.

14. A dynamic crosslinking composition comprising 10 to 300 parts by weight of a thermoplastic resin and 0.01 to 30 parts by weight of a crosslinking agent with respect to 100parts by weight of the hydrogenated block copolymer or the functionalized hydrogenated block copolymer according to claim 1.

15. A dynamically crosslinked body, obtained by melting and kneading the dynamic crosslinking composition according to claim 14 at a high temperature.

16. A crosslinking and foaming composition comprising the hydrogenated block copolymer or the functionalized hydrogenated block copolymer according to claim 1, a crosslinking agent, and a foaming agent.

17. A crosslinked and foamed body, obtained by crosslinking and foaming the crosslinking and foaming composition according to claim 16.

18. A functionalized hydrogenated block copolymer resin composition, comprising the functionalized hydrogenated block copolymer (E) according to claim 13, and a polar thermoplastic resin (F) having a functional group reactive with the component (E), and/or a rubbery polymer (F) having a functional group reactive with the component (E), wherein the formulation ratio (weight ratio) of the component(s) (E) to the component (F) is 1/99 to 99/1.

19. The functionalized hydrogenated block copolymer resin composition according to claim 18, wherein the component (F) is at least one polar thermoplastic resin selected from polyester resins, polyamide resins, polycarbonate resins, polyurethane resins, polyphenylene ether resins and polyoxymethylene resins.

20. A method of manufacturing a dynamic crosslinking composition comprising selectively hydrogenating a straight-chain block copolymer comprising:
   at least two polymer blocks A which each comprise a vinyl aromatic monomer unit as a main component and which may be the same or different from each other;
   at least two polymer blocks B which each comprise a conjugated diene monomer unit having 5 or more carbon atoms as a main component and which may be the same or different from each other; and
   one or more polymer blocks C which each comprise a conjugated diene monomer unit having 4 or more carbon atoms as a main component and which may be the same or different from each other; and/or one or more random copolymer blocks D which each comprise a conjugated diene monomer unit having 4 or more carbon atoms (d-1) and a vinyl aromatic monomer unit (d-2) as main components and which may be the same or different,
   wherein the polymer block A has a weight-average molecular weight M of 21,000 or more;
   the polymer block B has a hydrogenation rate of 50% or less for olefinic unsaturated double bonds;
   the polymer blocks C and D have a hydrogenation rate of 80% or more for olefinic unsaturated double bonds;
   the block copolymer comprises 10% by weight to 85% by weight of the vinyl aromatic monomer unit;
   the block copolymer has contents of 10% by weight to 70% by weight of A, 1% by weight to 15% by weight of B, 0% by weight to 85% by weight of C, 0% by weight to 85% by weight of D and 25% by weight to 85% by weight of C+D, based on 100% by weight of the total of A+B+C+D;
   and
   the A, B, C, and D are arranged linearly.

21. The hydrogenated block copolymer according to claim 1, wherein the hydrogenated straight-chain block copolymer excludes the polymer block D.

22. The method according to claim 20, wherein the hydrogenated straight-chain block copolymer excludes the polymer block D.

23. The hydrogenated block copolymer according to claim 1, wherein the hydrogenated straight-chain block copolymer excludes the polymer block D.

24. The method according to claim 20, the hydrogenated straight-chain block copolymer excludes the polymer block D.

25. The hydrogenated block copolymer according to claim 1, wherein the hydrogenated straight-chain block copolymer consists of the polymer blocks A, the polymer blocks B, and the one or more polymer blocks C and/or the one or more random copolymer blocks D.

26. The method according to claim 20, wherein the hydrogenated straight-chain block copolymer consists of the polymer blocks A, the polymer blocks B, and the one or more polymer blocks C and/or the one or more random copolymer blocks D.

* * * * *